United States Patent
Oka et al.

(10) Patent No.: US 10,336,037 B2
(45) Date of Patent: *Jul. 2, 2019

(54) GALVANIZED STEEL SHEET AND METHOD FOR PRODUCING THE SAME

(71) Applicant: NIPPON STEEL & SUMITOMO METAL CORPORATION, Tokyo (JP)

(72) Inventors: Masaharu Oka, Himeji (JP); Nobuhiro Fujita, Tokai (JP); Manabu Takahashi, Kisarazu (JP); Riki Okamoto, Kimitsu (JP); Kenichiroh Matsumura, Kimitsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 27 days.

This patent is subject to a terminal disclaimer.

(21) Appl. No.: 14/787,372

(22) PCT Filed: Apr. 28, 2014

(86) PCT No.: PCT/JP2014/061813
§ 371 (c)(1),
(2) Date: Oct. 27, 2015

(87) PCT Pub. No.: WO2014/178358
PCT Pub. Date: Nov. 6, 2014

(65) Prior Publication Data
US 2016/0075109 A1    Mar. 17, 2016

(30) Foreign Application Priority Data
May 1, 2013    (JP) ................................. 2013-096427

(51) Int. Cl.
*B32B 15/01*    (2006.01)
*C23C 2/02*    (2006.01)
(Continued)

(52) U.S. Cl.
CPC ............ *B32B 15/013* (2013.01); *B32B 15/01* (2013.01); *B32B 15/04* (2013.01); *B32B 15/043* (2013.01);
(Continued)

(58) Field of Classification Search
CPC ....... B32B 15/013; B32B 15/01; B32B 15/04; B32B 15/043; B32B 15/18; C22C 18/00;
(Continued)

(56) References Cited

U.S. PATENT DOCUMENTS

2004/0202889 A1   10/2004  Fujita et al.
2006/0231177 A1   10/2006  Bano et al.
(Continued)

FOREIGN PATENT DOCUMENTS

CN    1483090 A    3/2004
CN    101163811 A    4/2008
(Continued)

OTHER PUBLICATIONS

Machine Translation, Honda et al., JP 2011-132602, Jul. 2011.*
(Continued)

*Primary Examiner* — Michael E. La Villa
(74) *Attorney, Agent, or Firm* — Birch, Stewart, Kolasch & Birch, LLP

(57) ABSTRACT

A galvanized steel sheet according to the present invention includes a steel sheet and a galvanizing layer which is formed on a surface of the steel sheet. The steel sheet includes as a chemical component, by mass %, C: more than 0.100% to 0.500%, Si: 0.0001% to less than 0.20%, Mn: more than 0.20% to 3.00%, Al: 3.0% to 10.0%, N: 0.0030% to 0.0100%, Ti: more than 0.100% to 1.000%, P: 0.00001% to 0.0200%, S: 0.00001% to 0.0100% and a remainder including Fe and impurities. The galvanizing layer includes as a chemical composition, by mass %, Fe: 0.01% to 15%
(Continued)

and a remainder including Zn and impurities. The galvanized steel sheet has a specific gravity of 5.5 to less than 7.5.

4 Claims, 1 Drawing Sheet

(51) Int. Cl.

| | | |
|---|---|---|
| C23C 2/06 | (2006.01) | |
| C22C 38/38 | (2006.01) | |
| C22C 38/28 | (2006.01) | |
| C22C 38/16 | (2006.01) | |
| C22C 38/00 | (2006.01) | |
| C22C 38/12 | (2006.01) | |
| C22C 38/08 | (2006.01) | |
| C22C 38/06 | (2006.01) | |
| C22C 38/04 | (2006.01) | |
| C22C 38/02 | (2006.01) | |
| C22C 38/14 | (2006.01) | |
| B32B 15/04 | (2006.01) | |
| C23C 30/00 | (2006.01) | |
| C23C 2/04 | (2006.01) | |
| B32B 15/18 | (2006.01) | |
| C23C 2/26 | (2006.01) | |
| C23C 2/28 | (2006.01) | |
| C23C 2/40 | (2006.01) | |
| C22C 18/00 | (2006.01) | |
| C21D 8/04 | (2006.01) | |
| C21D 9/46 | (2006.01) | |

(52) U.S. Cl.
CPC ............ *B32B 15/18* (2013.01); *C21D 8/0436* (2013.01); *C21D 8/0473* (2013.01); *C22C 18/00* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/38* (2013.01); *C23C 2/02* (2013.01); *C23C 2/04* (2013.01); *C23C 2/06* (2013.01); *C23C 2/26* (2013.01); *C23C 2/28* (2013.01); *C23C 2/40* (2013.01); *C23C 30/00* (2013.01); *C23C 30/005* (2013.01); *C21D 8/0478* (2013.01); *C21D 9/46* (2013.01); *Y10T 428/12792* (2015.01); *Y10T 428/12799* (2015.01); *Y10T 428/12951* (2015.01); *Y10T 428/12958* (2015.01); *Y10T 428/12972* (2015.01); *Y10T 428/12979* (2015.01)

(58) Field of Classification Search
CPC ... C22C 38/001; C22C 38/002; C22C 38/005; C22C 38/02; C22C 38/04; C22C 38/06; C22C 38/12; C22C 38/16; C22C 38/28; C22C 38/38; C22C 38/00; C22C 38/14; C22C 38/08; C22C 38/18; C22C 38/20; C22C 38/22; C22C 38/24; C22C 38/26; C22C 38/32; C22C 38/40; C22C 38/42; C22C 38/44; C22C 38/46; C22C 38/50; C22C 38/54; C23C 2/06; C23C 2/28; C23C 2/40; C23C 2/02; C23C 2/04; C23C 2/26; C23C 30/00; C23C 30/005; C21D 9/46; C21D 8/0436; C21D 8/0473; C21D 8/0478; Y10T 428/12792; Y10T 428/12799; Y10T 428/12951; Y10T 428/12958; Y10T 428/12972; Y10T 428/12979

See application file for complete search history.

(56) References Cited

U.S. PATENT DOCUMENTS

| | | |
|---|---|---|
| 2006/0269776 A1 | 11/2006 | Tanaka et al. |
| 2006/0292391 A1 | 12/2006 | Ikematsu et al. |
| 2009/0162691 A1 | 6/2009 | Ishizuka et al. |
| 2010/0112377 A1 | 5/2010 | Kaneko et al. |
| 2011/0287280 A1 | 11/2011 | Shiraki et al. |
| 2014/0342183 A1 | 11/2014 | Wakabayashi et al. |
| 2016/0040273 A1* | 2/2016 | Oka .................. C22C 38/02 420/79 |

FOREIGN PATENT DOCUMENTS

| | | |
|---|---|---|
| CN | 101646797 A | 2/2010 |
| CN | 101736195 A | 6/2010 |
| CN | 102260821 A | 11/2011 |
| EP | 1 354 970 A1 | 10/2003 |
| EP | 2 128 293 A1 | 12/2009 |
| JP | 57-76176 A | 5/1982 |
| JP | 3-226550 A | 10/1991 |
| JP | 4-13855 A | 1/1992 |
| JP | 4-147953 A | 5/1992 |
| JP | 9-227997 A | 9/1997 |
| JP | 2003-328088 A | 11/2003 |
| JP | 2005-15909 A | 1/2005 |
| JP | 2005-29889 A | 2/2005 |
| JP | 2005-273004 A | 10/2005 |
| JP | 2006-176843 A | 7/2006 |
| JP | 2006-176844 A | 7/2006 |
| JP | 2007-84913 A | 4/2007 |
| JP | 2007-321168 A | 12/2007 |
| JP | 2008-261023 A | 10/2008 |
| JP | 2009-263780 A | 11/2009 |
| JP | 2010-121209 A | 6/2010 |
| JP | 2010-229538 A | 10/2010 |
| JP | 2010-270377 A | 12/2010 |
| JP | 2011-132602 A | 7/2011 |
| RU | 2312162 C2 | 12/2007 |
| RU | 2312920 C2 | 12/2007 |
| RU | 2323983 C2 | 5/2008 |
| RU | 2418094 C2 | 5/2011 |
| TW | 200706693 A | 2/2007 |
| TW | 200728474 A | 8/2007 |
| WO | WO 2013/034317 A1 | 3/2013 |
| WO | WO 2013/047830 A1 | 4/2013 |

OTHER PUBLICATIONS

Japanese Notice of Reasons for Rejection for counterpart Japanese Application No. 2015-514837, dated Nov. 29, 2016, with an English translation.
Korean Office Action, dated Aug. 26, 2016, for Korean Application No. 10-2015-7030723, along with an English translation.
Chinese Office Action and Search Report, dated Jun. 20, 2016, for counterpart Chinese Application No. 201480024752.X, with an English translation.
International Search Report, issued in PCT/JP2014/061813, dated Jul. 8, 2014.
Office Action, issued in TW 103115152, dated Apr. 13, 2015.
Written Opinion of the International Searching Authority, issued in PCT/JP2014/061813, dated Jul. 8, 2014.
Russian Office Action and Search Report, dated Feb. 16, 2017, for counterpart Russian Application No. 2015147307, with an English translation of the Office Action.
International Search Report (Form PCT/ISA/210), dated Jul. 8, 2014, for International Application No. PCT/JP2014/061814, with English translation.
Written Opinion of the International Searching Authority (Form PCT/ISA/237), dated Jul. 8, 2014, for International Application No. PCT/JP2014/061814.

(56) References Cited

OTHER PUBLICATIONS

Chinese Decison of Rejection, dated Mar. 27, 2017, for Chinese Patent Application No. 201480022843.X, with English translation.
Chinese Office Action and Search Report, dated May 26, 2016, for Chinese Application No. 201480022843.X, with English translation.
European Office Action, dated Jul. 3, 2017, for European Application No. 14791416.2.
Extended European Search Report, dated Nov. 14, 2016, for European Application No. 14791416.2.

* cited by examiner

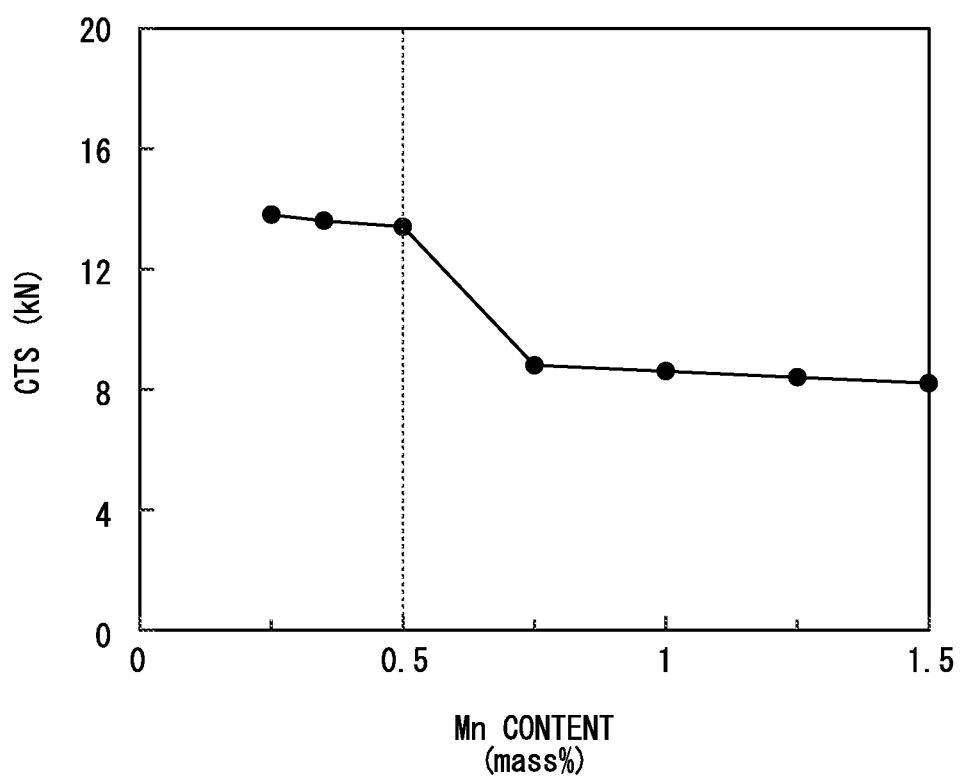

GALVANIZED STEEL SHEET AND METHOD FOR PRODUCING THE SAME

TECHNICAL FIELD OF THE INVENTION

The present invention relates to a high-strength low-specific-gravity galvanized steel sheet having superior galvanizing property and hole expandability which is used for an automobile component or the like, and method for producing the same.

Priority is claimed on Japanese Patent Application No. 2013-96427, filed on May 1, 2013, the content of which is incorporated herein by reference.

RELATED ART

Recently, as a countermeasure against environmental problems, reduction in the weight of a vehicle has been desired in order to reduce carbon dioxide emissions and fuel consumption. In order to reduce the weight of a vehicle, high-strengthening of steel is an effective means. However, when the lower limit of the thickness of a steel sheet is limited due to rigidity required for a component, the thickness of the steel sheet cannot be reduced even after high-strengthening of steel, and it is difficult to reduce the weight of a vehicle.

Therefore, for example, as disclosed in Patent Documents 1 to 5, some of the present inventors proposed a high Al-content steel sheet in which the specific gravity is reduced by adding a large amount of Al to steel. In the high Al-content steel sheets disclosed in Patent Documents 1 to 5, problems of a high Al-content steel sheet of the related art including poor producibility such as cracking, which may occur during rolling, and low ductility are solved. Further, in order to improve the ductility, the hot workability, and the cold workability of a high Al-content steel sheet, for example, as disclosed in Patent Document 6, the present inventors proposed a method of adjusting a solidification structure after casting to be a fine equiaxed structure. Further, for example, as disclosed in Patent Document 7, the present inventors proposed a method of improving the toughness of a high Al-content steel sheet by optimizing the components thereof.

PRIOR ART DOCUMENT

Patent Document

[Patent Document 1] Japanese Unexamined Patent Application, First Publication No. 2005-15909
[Patent Document 2] Japanese Unexamined Patent Application, First Publication No. 2005-29889
[Patent Document 3] Japanese Unexamined Patent Application, First Publication No. 2005-273004
[Patent Document 4] Japanese Unexamined Patent Application, First Publication No. 2006-176843
[Patent Document 5] Japanese Unexamined Patent Application, First Publication No. 2006-176844
[Patent Document 6] Japanese Unexamined Patent Application, First Publication No. 2008-261023
[Patent Document 7] Japanese Unexamined Patent Application, First Publication No. 2010-270377

DISCLOSURE OF THE INVENTION

Problems to be Solved by the Invention

Recently, a high Al-content steel sheet having superior ductility, workability, and toughness has been able to be produced on an industrial scale. However, there is a problem that the high Al-content steel sheet has poor galvanizing property. In addition, the hole expandability of the high Al-content steel sheet is lower than that of a general automobile steel sheet having the same strength, and thus the use of the high Al-content steel sheet is limited. Accordingly, the improvements of the galvanizing property and the hole expandability are important issues for increasing the application range of the high Al-content steel sheet to automobile components. The high Al-content steel sheet has, for example, superior arc weldability. However, the spot weldability of the high Al-content steel sheet is lower than that of a general automobile steel sheet having the same strength, and thus the use of the high Al-content steel sheet is limited. Here, a poor galvanizing property means that a non-plating zone is generated on the steel sheet, that plating adhesion is reduced, or that both phenomenons occurred.

The present invention has been made in consideration of the above-described actual circumstances, and an object thereof is to provide a high-strength low-specific-gravity galvanized steel sheet having superior galvanizing property and hole expandability which is obtained by improving the galvanizing property and the hole expandability of a high Al-content steel sheet having low-specific-gravity to which Al is added, and to provide a method for producing the same.

Means for Solving the Problem

The present inventors investigated hot-dip galvanizing conditions in order to improve the galvanizing property and the hole expandability of a high Al-content steel sheet based on the chemical components of the high-strength low-specific-gravity high Al-content steel sheet having superior ductility, workability and toughness, which is suggested by the present inventors in Patent Document 7. As a result, the present inventors found that the galvanizing property and the hole expandability of the high Al-content steel sheet can be improved by being subjected to hot-dip galvanizing under the appropriate conditions, after a treatment such as annealing, mechanical descaling or pickling is subjected to a hot-rolled steel sheet or a cold-rolled steel sheet as necessary, and Ni-preplating is subjected to the hot-rolled steel sheet or the cold-rolled steel sheet. Furthermore, after the hot-dip galvanizing is performed, the high Al-content steel plate can be improved in terms of formability, coating corrosion resistance, weldability and the like by being subjected to an alloying heat treatment under the appropriate conditions. Hereinafter, a high Al-content steel sheet may be referred to as a steel sheet.

In addition, in order to improve the spot weldability of the galvanized steel sheet that is the high Al-content steel sheet performed by a hot-dip galvanizing treatment and an alloying treatment as necessary, the present inventors investigated elements which decrease spot weldability. As a result, the present inventors found the following facts: the spot weldability of a galvanized steel sheet is greatly affected by the Mn content thereof; and the spot weldability thereof can be significantly improved by reducing the Mn content thereof.

The summary of the present invention is as follows.

(1) According to an aspect of the present invention, a galvanized steel sheet includes: a steel sheet; and a galvanizing layer which is formed on a surface of the steel sheet; in which the steel sheet includes as a chemical component, by mass %, C: more than 0.100% to 0.500%, Si: 0.0001% to less than 0.20%, Mn: more than 0.20% to 3.00%, Al: 3.0% to 10.0%, N: 0.0030% to 0.0100%, Ti: more than 0.100% to 1.000%, P: 0.00001% to 0.0200%, S: 0.00001% to 0.0100% and a remainder including Fe and impurities; in which the sum of the C content and the Ti content satisfies 0.200<C+Ti≤1.500, by mass %, the product of the Al content and the Si content satisfies Al×Si≤0.8, and the galvanizing layer includes as a chemical component, by mass %, Fe: 0.01% to 15%, Ni: 0.05% to 1.0%, Al: 0.15% to 2.0% and a remainder including Zn and impurities; and in which the galvanized steel sheet has a specific gravity of 5.5 to less than 7.5.

(2) In the galvanized steel sheet according to (1), the galvanizing layer may be a hot-dip galvanizing layer and may include as the chemical component, by mass %, Fe: 0.01% to less than 7%.

(3) In the galvanized steel sheet according to (1), the galvanizing layer may be a hot-dip galvannealing layer and may include as the chemical component, by mass %, Fe: 7% to 15%.

(4) In the galvanized steel sheet according to any one of (1) to (3), the steel sheet may further include as a chemical component, by mass %, one element or two or more elements selected from the group consisting of, by mass %, Nb: 0.300% or less, V: 0.50% or less, Cr: 3.00% or less, Mo: 3.00% or less, Ni: 5.00% or less, Cu: 3.00% or less, B: 0.0100% or less, Ca: 0.0100% or less, Mg: 0.0100% or less, Zr: 0.0500% or less, and REM: 0.0500% or less.

(5) In the galvanized steel sheet according to any one of (1) to (4), the Mn content of the steel sheet may be more than 0.20% to 0.50%, by mass %.

(6) According to another aspect of the present invention, a method for producing a galvanized steel sheet includes: performing a Ni-preplating treatment to a steel sheet so as to set a plating amount of Ni to 0.2 g/m² to 2 g/m² per one-sided surface of the steel sheet, in which the steel sheet includes as a chemical component, by mass %, C: more than 0.100% to 0.500%, Si: 0.0001% to less than 0.20%, Mn: more than 0.20% to 3.00%, Al: 3.0% to 10.0%, N: 0.0030% to 0.0100%, Ti: more than 0.100% to 1.000%, P: 0.00001% to 0.0200%, S: 0.00001% to 0.0100% and a remainder including Fe and impurities, the sum of the C content and a Ti content satisfies 0.200<C+Ti≤1.500, by mass %, and the product of the Al content and the Si content satisfies Al×Si≤0.8; performing a heating treatment to the steel sheet to which the Ni-preplating treatment is performed to a temperature of 430° C. to 480° C. at a heating rate of 20° C./sec or more; performing a hot-dip galvanizing treatment by immersing the steel sheet into a galvanizing bath having a bath temperature of 440° C. to 470° C., and including, by mass %, Al: 0.1% to 0.4% and a remainder including Zn and impurities.

(7) In the method for producing a galvanized steel sheet according to (6), the method for producing a galvanized steel sheet may further include, performing an alloying heat treatment at a temperature of 470° C. to 560° C. for a heating time of 10 seconds to 40 seconds after the hot-dip galvanizing treatment is performed.

Effects of the Invention

According to the above-described aspects (1) to (7), a high-strength low-specific-gravity galvanized steel sheet having high producibility, a superior galvanizing property, and a superior hole expandability can be obtained. In addition, according to the above-described aspect (5), a high-strength low-specific-gravity galvanized steel sheet having not only superior galvanizing property and hole expandability but also superior spot weldability can be obtained by controlling the Mn content of the galvanized steel sheet, which remarkably contributes to industry.

BRIEF DESCRIPTION OF THE DRAWINGS

FIG. 1 is diagram showing a relationship between the Mn content of a galvannealed steel sheet and the cross tension strength (CTS) of a resistance spot welded joint.

EMBODIMENT OF THE INVENTION

The present inventors investigated in order to improve the galvanizing property and the hole expandability of the galvanized steel sheet that is the high Al-content steel sheet performed by the hot-dip galvanizing treatment and the galvannealing treatment as necessary. Specifically, the present inventors produced a hot-rolled steel sheet and a cold-rolled steel sheet using various kinds of steel having different amounts of alloy elements in the chemical component of the above-described high-strength low-specific-gravity high Al-content steel sheet disclosed in Patent Document 7 having superior ductility, workability, and toughness. Furthermore, a hot-dip galvanizing treatment is subjected to the produced hot-rolled steel sheet and cold-rolled steel sheet under the various conditions including Ni-preplating treatment, and the present inventors evaluated the galvanizing property and the hole expandability before or after the hot-dip galvanizing treatment. Therefore, a galvanized steel sheet that is a high Al-content steel sheet that has been subjected to the hot-dip galvanizing treatment and the galvannealing treatment of this embodiment has high strength and low specific gravity.

Regarding a common method of hot-dip galvanizing, after heating the steel sheet to a high temperature, a hot-dip galvanizing treatment is subjected to a high Al-content steel sheet in a cooling process. In the common method of hot-dip galvanizing, a place where a plating layer is not formed is generated (non-plating) or plating adhesion is low. Therefore, an excellent galvanizing property cannot be obtained. However, the present inventors found for the first time that Ni-preplating is subjected to a hot-rolled steel sheet or a cold-rolled steel sheet to which a treatment such as annealing, mechanical descaling or pickling was subjected as necessary, and the galvanizing property of a steel sheet can be further improved by reheating the steel sheet after performing Ni-preplating, and by hot-dip galvanizing the steel sheet. In addition, excellent hole expandability in a galvanized steel sheet cannot be obtained by the common method of hot-dip galvanizing. However, the present inventors found for the first time that the Ni-preplating was subjected to a hot-rolled steel sheet or a cold-rolled steel sheet, and the hole expandability of the galvanized steel sheet can be improved by heating the steel sheet to a temperature of 430° C. to 480° C. at a heating rate of 20° C./sec or more after Ni-preplating was performed, and then by hot-dip galvanizing in which the steel sheet is immersed in a galvanizing bath. In addition, the present inventors found that the hole expandability of the galvanized steel sheet can be improved by performing an alloying heat treatment after the hot-dip galvanizing treatment is preferably performed at a heating temperature of 470° C. to 570° C. for a heating time of 10 seconds to 40 seconds.

Furthermore, the present inventors performed investigations in order to improve the spot weldability of a galvanized steel sheet. Specifically, the present inventors produced a hot-rolled steel sheet and a cold-rolled steel sheet in the laboratory, by using various kinds of steel having different amounts of alloy elements in the chemical component of the above-described high-strength low-specific-gravity high Al-content steel sheet disclosed in Patent Document 7 having superior ductility, workability, and toughness. Then, hot-dip galvanizing is performed in which the steel sheet is immersed into a galvanizing bath, after Ni-preplating is subjected to the produced steel sheet. Using these obtained galvanized steel sheets, the spot weldability was evaluated. Here, the tensile strengths of the obtained galvanized steel sheets were about 500 MPa, the thickness was 2.3 mm in a case where the steel sheet before plating was a hot-rolled steel sheet, and the thickness was 1.2 mm in a case where the steel sheet before plating was the cold-rolled steel sheet. The spot weldability of the galvanized steel sheet was evaluated based on the cross tension strength of a resistance spot welded joint which was obtained in a tension test according to JIS Z 3137. In addition, when t is a sheet thickness of a galvanized steel sheet, spot welding was performed using an ordinary spot welding machine under welding conditions which were adjusted such that a nugget diameter was $5 \times \sqrt{t}$ (mm). FIG. 1 shows the effect of the Mn content of the galvanized steel sheet on the cross tension strength (CTS) of the galvanized steel sheet that galvannealing treatment was subjected to the hot-rolled steel sheet. It was found that, by adjusting the Mn content of the galvanized steel sheet to be 0.5 mass % or less as shown in FIG. 1, the CTS can be significantly improved. In the case where galvanizing treatment was subjected to the cold-rolled steel sheet, as in the case where galvanizing treatment was subjected to the hot-rolled steel sheet, it was found that by adjusting the Mn content of the galvanized steel sheet to be 0.5 mass % or less, the CTS can be significantly improved. In addition, the required value of the CTS changes depending on a thickness of a steel sheet or a tensile strength of a steel sheet. For example, in a case of a hot-rolled steel sheet having a thickness of 2.3 mm, CTS is preferably to be 8.0 kN or more. In addition, in a case of a cold-rolled steel sheet having a thickness of 1.2 mm, CTS is preferably 5.0 kN or more.

Next, the reason for limiting the chemical component of a high Al-content steel sheet that is a base metal of the galvanized steel sheet according to an embodiment of the present invention having superior galvanizing property and hole expandability will be described. "%" represents "mass %".

C: more than 0.100% to 0.500%

C is an essential element for adjusting a solidification structure to be a fine equiaxed structure during casting. Therefore, the C content is more than 0.100%. On the other hand, when the C content is more than 0.500%, the toughness and arc weldability of the galvanized steel sheet deteriorate. Accordingly, the C content is more than 0.100% to 0.500%.

Ti: more than 0.100% to 1.000%

Ti is an essential element for adjusting a solidification structure to be a fine equiaxed structure during casting. Therefore, the Ti content is more than 0.100%. When the Ti content is more than 1.000%, the toughness of the galvanized steel sheet is decreased. Accordingly, the Ti content is more than 0.100% to 1.000%. In addition, in order to obtain suitable Ni-preplating, the Ti content is preferably 0.300% or more. This is because Ti limits the diffusion of Ni in the Ni-preplating treatment. Therefore, the lower limit of the Ti content is preferably 0.300%, more preferably 0.310%, and still more preferably 0.320%.

0.200%<C+Ti<1.500%

In order to adjust the solidification structure to he a finer equiaxed structure during casting, the sum of the C content and the Ti content, that is, C+Ti is more than 0.200% to 1.500%. In addition, in order to obtain suitable Ni-preplating, C+Ti is preferably 0.300% or more, more preferably 0.400% or more, and still more preferably 0.500% or more. The upper limit of C+Ti is preferably 1.300%, more preferably 1.200%, and still more preferably 1.000%.

Al: 3.0% or more to 10.0%

Al is an essential element for achieving the low-specific-gravity of the galvanized steel sheet. When the Al content is less than 3.0%, the low-specific-gravity effect is insufficient, and the specific gravity cannot be reduced to be less than 7.5. When the Al content is more than 10.0%, the precipitation of an intermetallic compound is significant, and ductility, workability, and toughness are decreased. Accordingly, the Al content is 3.0% to 10.0%. In order to obtain superior ductility, the upper limit of the Al content is preferably 6.0%.

Si: 0.0001% to 0.20%

Si decreases the galvanizing property of the galvanized steel sheet in general. In addition, S is an element which decreases the toughness of the galvanized steel sheet and it is necessary to reduce the Si content of the galvanized steel sheet. Therefore, the upper limit of the Si content is less than 0.20%. On the other hand, the lower limit of the Si content is 0.0001% inconsideration of the current refining techniques and the production cost.

Al×Si≤0.8

The product of the Al content and the Si content, that is, Al×Si, is 0.8 or less. As a result, far superior toughness can be obtained. It is preferable that Al×Si be reduced to he as small as possible. Although the lower limit of Al×Si is not particularly limited, the lower limit of Al×Si is preferably 0.03 in consideration of the refining technique and the production cost.

Mn: more than 0.20% to 3.00%

Mn is an effective element for forming MnS to limit grain boundary embrittlement caused by solid solution S. However, when the Mn content is 0.20% or less, the effect is not exhibited. In addition, when the Mn content is more than 3.00%, the toughness of the galvanized steel sheet is decreased. Accordingly, the Mn content is more than 0.20% to 3.00%.

When the Mn content is more than 0.50%, the spot weldability of the galvanized steel sheet is decreased. Accordingly, in a case where the spot weldability of the galvanized steel sheet is required, the upper limit of the Mn content is preferably 0.50%.

P: 0.00001% to 0.0200%

P is an impurity element which is segregated in a grain boundary to decrease the grain boundary strength and the toughness of the galvanized steel sheet, and it is preferable to reduce the P content of the galvanized steel sheet. Therefore, the upper limit of the P content is 0.0200%. In addition, the lower limit of the P content is 0.00001% in consideration of the current refining techniques and the production cost.

S: 0.00001% to 0.0100%

S is an impurity element which decreases the hot workability and toughness of the galvanized steel sheet, and it is preferable to reduce the S content of the galvanized steel sheet. Therefore, the upper limit of the S content is 0.0100%. In addition, the lower limit of the S content is 0.00001% in consideration of the current refining techniques and the production cost.

N: 0.0030% to 0.0100%

N is an essential element for forming a nitride and/or carbon nitride with Ti, that is, TiN and Ti(C, N) to adjust the solidification structure to be a fine equiaxed structure. This effect is not exhibited when the N content is less than 0.0030%. In addition, when the N content is more than 0.0100%, the toughness of the galvanized steel sheet is decreased due to the generation of coarse TiN. Accordingly, the N content is 0.0030% to 0.0100%.

The above-described elements are basic components of the high Al-content steel sheet that is a base metal of the galvanized steel sheet according to the embodiment, and a remainder other than the above-described elements includes Fe and unavoidable impurities. Therefore, the above-described chemical composition is a basic composition of the high Al-content steel sheet that is a base metal of the galvanized steel sheet according to the embodiment of the present invention. However, in addition to these basic components, depending on the desired strength level and other required characteristics, one element or two or more elements of Nb, V, Cr, Ni, Mo, Cu, B, Ca, Mg, Zr, and REM may be added to the high Al-content steel sheet that is a base metal of the galvanized steel sheet according to the embodiment instead of a part of Fe in the remainder.

Nb: 0.300% or less

Nb is an element for forming a fine carbon nitride and is effective to limit the coarsening of crystal grains. In order to improve the toughness of the galvanized steel sheet, it is preferable to add 0.005% or more of Nb. However, when an excess amount of Nb is added, a precipitate is coarsened, and the toughness of the galvanized steel sheet may be decreased. Accordingly, the Nb content is preferably 0.300% or less.

V: 0.50% or less

Like Nb, V is an element which forms a fine carbon nitride. In order to limit the coarsening of crystal grains and to improve the toughness of the galvanized steel sheet, it is preferable to add 0.01% or more of V. When the V content is more than 0.50%, the toughness of the galvanized steel sheet may be decreased. Therefore, the upper limit of the V content is preferably 0.50%.

Cr: 3.00% or less
Mo: 3.00% or less
Ni: 5.00% or less
Cu: 3.00% or less

Cr, Mo Ni, and Cu are effective elements for improving the ductility and toughness of the galvanized steel sheet.

However, when each of the Cr content, the Mo content, and the Cu content is more than 3.00%, the toughness may be deteriorated along with an increase in strength of the galvanized steel sheet. In addition, when the Ni content is more than 5.00%, the toughness may be deteriorated along with an increase in the strength of the galvanized steel sheet. Accordingly, the upper limit of the Cr content is preferably 3.00%, the upper limit of the Mo content is preferably 3.00%, the upper limit of the Ni content is preferably 5.00%, and the upper limit of the Cu content is preferably 3.00%. In addition, in order to improve the ductility and toughness of the galvanized steel sheet, the Cr content is preferably 0.05% or more, the Mo content is preferably 0.05% or more, the Ni content is preferably 0.05% or more, and the Cu content is preferably 0.10% or more.

B: 0.0100% or less

B is an element which is segregated in a grain boundary to limit the grain boundary segregation of P and S. However, when the B content is more than 0.0100%, a precipitate is generated, and a hot workability of the galvanized steel sheet may be deteriorated. Accordingly, the B content is 0.0100% or less. In order to improve the ductility, toughness, and hot workability of the galvanized steel sheet through grain boundary strengthening, the B content is preferably 0.0003% or more.

Ca: 0.0100% or less
Mg: 0.0100% or less
Zr: 0.0500% or less
REM: 0.0500% or less Ca, Mg, Zr, and REM are effective elements for controlling the form of a sulfide to limit deterioration in the hot workability and toughness of the galvanized steel sheet caused by S. However, when excess amounts of the elements are added, the effect is saturated. Therefore, the Ca content is preferably 0.0100% or less, the Mg content is preferably 0.0100% or less, the Zr content is preferably 0.0500% or less, and the REM content is preferably 0.0500% or less. In addition, in order to improve the toughness of the galvanized steel sheet, the Ca content is preferably 0.0010% or more, the Mg content is preferably 0.0005% or more, the Zr content is preferably 0.0010% or more, and the REM content is preferably 0.0010% or more.

Next, characteristics of the galvanized steel sheet according to the embodiment will be described.

When the specific gravity of the galvanized steel sheet is 7.5 or more, the weight reduction effect is lower as compared to with the specific gravity that is equivalent to 7.86 which is the specific gravity of iron of a steel sheet which is typically used as an automobile steel sheet. Therefore, the specific gravity of the galvanized steel sheet is less than 7.5. In addition, because of the range of the chemical component of the galvanized steel sheet, the specific gravity of the galvanized steel sheet is 5.5 or more. The specific gravity of the galvanized steel sheet is determined according to the component composition, and it is preferable to increase the Al content contributing to the weight reduction.

Regarding the tensile strength and hole expandability of the galvanized steel sheet, in consideration of characteristics required for an automobile steel sheet, the tensile strength is preferably 440 MPa or higher, and the hole expandability $\lambda$, is preferably 80% or higher. In addition, TS×$\lambda$ is preferably 30000 MPa·% or more.

Next, a hot-dip galvanizing layer and a hot-dip galvannealing layer of a galvanized steel sheet according to the embodiment of the present invention will be described.

A hot-dip galvanizing layer and a hot-dip galvannealing layer include Fe, Ni, Al and a remainder including Zn and impurities. Hereinafter, "%" represents "mass %".

In a case where more preferred formability in addition to corrosion resistance is required to a galvanized steel sheet, properties such as formability, coating corrosion resistance and weldability can be improved by performing an alloying heat treatment after a hot-dip galvanizing treatment is performed. Specifically, an alloying heat treatment is performed after a hot-dip galvanizing treatment is performed in which the steel sheet is immersed into a hot-dip galvanizing bath. Therefore, Fe can be diffused into a hot-dip galvannealing layer and a galvanizing layer that is alloyed can formed. Accordingly, the Fe content of a galvanizing layer in a galvanized steel sheet according to an embodiment of the present invention is 0.01% to 15%.

The Fe content of a hot-dip galvannealing layer to which an alloying heat treatment is performed is 7% to 15%. When the Fe content of the hot-dip galvannealing layer is lower than 7%, flaking (sliding resistance) of the galvanized steel sheet is deteriorated. In addition, when the Fe content of the hot-dip galvannealing layer is more than 15%, powdering property of the galvanized steel sheet is reduced.

In this case, a galvannealed steel sheet includes a steel sheet; and a hot-dip galvannealing layer which is formed on a surface of the steel sheet; and the steel sheet includes as a chemical composition, by mass %, C: more than 0.100% to 0.500%, Si: 0.0001% to less than 0.20%, Mn: more than 0.20% to 3.00%, Al: 3.0 to 10.0%, N: 0.0030% to 0.0100%, Ti: more than 0.100% to 1.000%, P: 0.00001% to 0.0200%, S: 0.00001% to 0.0100%, the sum of the C content and the Ti content satisfies 0.200<C+Ti≤1.500 by mass %, the product of the Al content and the Si content satisfies Al×Si≤0.8 and a remainder including Fe and impurities; and the hot-dip galvannealing layer includes, by mass %, Fe: 7% to 15%, Ni: 0.05% to 1.0%, Al: 0.15% to 2.0% and a remainder including Zn and impurities; and has a specific gravity of 5.5 to less than 7.5.

On the other hand, a Fe content of a hot-dip galvanizing layer to which an alloying heat treatment is not performed is lower than 7%. When the Fe content of the hot-dip galvanizing layer is 7% or more, it is necessary to be immersed for a long time in the galvanizing bath and productivity is greatly reduced. When the Fe content of the hot-dip galvanizing layer is lower than 7%, improvement effects which can be obtained by an alloying treatment for formability, coating corrosion resistance and weldability of the galvanized steel sheet cannot be obtained. Even if the Fe content of the hot-dip galvanizing layer is lower than 7%, the corrosion resistance of the galvanized steel sheet having a hot-dip galvanizing layer is good.

In this case, a hot-dip galvanized steel sheet includes a steel sheet; and a hot-dip galvanizing layer which is formed on a surface of the steel sheet; and the steel sheet includes as a chemical composition, by mass %, C: more than 0.100% to 0.500%, Si: 0.0001% to less than 0.20%, Mn: more than 0.20% to 3.00%, Al: 3.0 to 10.0%, N: 0.0030% to 0.0100%, Ti: more than 0.100% to 1.000%, P: 0.00001% to 0.0200%, S: 0.00001% to 0.0100%, the sum of the C content and the Ti content satisfies 0.200<C+Ti≤1.500 by mass %, the product of the Al content and the Si content satisfies Al×Si≤0.8 and a remainder including Fe and impurities; and the hot-dip galvanizing layer includes, by mass %, Fe: 0.01% to less than 7%, Ni: 0.05% to 1.0%, Al: 0.15% to 2.0% and a remainder including Zn and impurities; and has a specific gravity of 5.5 to less than 7.5.

The Ni content of a hot-dip galvanizing layer or a hot-dip galvannealing layer is obtained by Ni-preplating treatment. The Ni content of the hot-dip galvanizing layer or the hot-dip galvannealing layer is 0.05% or more and 1.0% or less. When the Ni content of the hot-dip galvanizing layer or the hot-dip galvannealing layer is lower than 0.05%, corrosion resistance of the galvanized steel sheet is deteriorated. When the Ni content of the hot-dip galvanizing layer or the hot-dip galvannealing layer is higher than 1.0%, powdering property of the galvanized steel sheet is deteriorated.

The Al content of a hot-dip galvanizing layer or a hot-dip galvannealing layer is 0.15% or more and 2.0% or less. When the Al content of the hot-dip galvanizing layer or the hot-dip galvannealing layer is lower than 0.15%, powdering property or corrosion resistance of the galvanized steel sheet is deteriorated. When the Al content of the hot-dip galvanizing layer or the hot-dip galvannealing layer is more than 2.0%, the coatability or corrosion resistance of the galvanized steel sheet is reduced.

A hot-dip galvanizing bath which is used for a hot-dip galvanizing treatment includes an amount of Al of 0.1% to 0.4%, and the remainder including Zn and impurities. As described above, Ni-preplating is used as Ni source for supplying Ni to a galvanizing layer.

A plating amount by a hot-dip galvanizing treatment is not particularly limited. However, from the viewpoint of the corrosion resistance of a galvanized steel sheet, the plating amount per one-sided surface is preferably 5 g/m$^2$ or more. For the purpose to improve coatability and the like, an upper layer plating may be performed or various treatments, for example, chromate treatment, phosphating, lubricity improving treatment and weldability improving treatment may be performed on a hot-dip galvanized steel sheet and a galvannealed steel sheet according to an embodiment of the present invention. These treatments do not exceed the scope of the embodiment of the present invention.

Next, a method for producing a hot-dip galvanized steel sheet and a galvannealed steel sheet according to the embodiment will be described.

In the embodiment, steel having the above-described chemical component is cast at a molten steel superheat temperature of 50° C. or lower, and the obtained billet is hot-rolled. Further, mechanical descaling, pickling, cold rolling, or annealing may be performed. The unit of temperature for measuring, for example, the molten steel superheat temperature, the liquidus temperature, or the molten steel temperature is degrees Celsius.

The molten steel superheat temperature is a value obtained by subtracting the molten steel temperature during casting from the liquidus temperature obtained from the chemical component, that is, "Molten steel superheat temperature=Molten Steel Temperature−Liquidus Temperature".

When the molten steel superheat temperature is higher than 50° C., TiN or Ti(C, N) crystallized in the liquid is aggregated and is coarsened. Therefore, TiN or Ti(C, N) crystallized in the liquid phase does not efficiently function as solidification nuclei of ferrite. Even when the chemical component of the molten steel according to the embodiment is in the above-described defined range, the solidification structure may be a columnar grain structure. Thus, cracks in the cast piece may occur. Accordingly, the molten steel superheat temperature is preferably 50° C. or lower. Although not limited, the lower limit of the molten steel superheat temperature is typically 10° C.

When the heating temperature of the billet in the hot-rolling process is lower than 1100° C., a carbon nitride is not sufficiently solid-soluted, and necessary strength and ductility may not be obtained. Accordingly, the lower limit of the heating temperature is preferably 1100° C. The upper limit of the heating temperature is not particularly limited. However, when the heating temperature is higher than 1250° C., the grain size of crystal grains are increased and hot workability may be decreased. Therefore, the upper limit of the heating temperature is preferably 1250° C.

When the finish rolling temperature is lower than 800° C., hot workability is decreased, and cracking may occur during hot rolling. Accordingly, the lower limit of the finish rolling temperature is preferably 800° C. The upper limit of the finish rolling temperature is not particularly limited. However, when the finish rolling temperature is higher than 1000° C., the grain size of crystal grains are increased and cracking may occur during cold rolling. Therefore, the upper limit of the finish rolling temperature is preferably 1000° C.

When the coiling temperature is lower than 600° C., the recovery and recrystallization of ferrite is insufficient, and the workability of the steel sheet may be deteriorated. Accordingly, the lower limit of the coiling temperature is preferably 600° C. On the other hand, when the coiling temperature is higher than 750° C., crystal grains of recrystallized ferrite are coarsened, and the ductility, hot workability, and cold workability of the steel sheet may be decreased. Accordingly, the upper limit of the coiling temperature is preferably 750° C.

In order to remove scale generated during hot rolling, for example, mechanical descaling using, for example, a tension leveler and/or pickling may be performed.

In order to improve the ductility of the hot-rolled steel sheet, annealing may be performed after hot rolling. In order to the form of a precipitate to improve ductility, the annealing temperature of the hot-rolled steel sheet is preferably 700° C. or higher. In addition, when the annealing temperature of the hot-rolled steel sheet is higher than 1100° C., crystal grains are coarsened, and grain boundary embrittlement may be promoted. Accordingly, the upper limit of the annealing temperature of the hot-rolled steel sheet is preferably 1100° C.

In order to remove scale after annealing the hot-rolled steel sheet, mechanical descaling and/or pickling may be performed.

The hot-rolled steel sheet may he cold-rolled and annealed to produce a cold-rolled steel sheet. Hereinafter, preferable production conditions of the cold-rolled steel sheet will he described.

The cold-rolling reduction during cold rolling is preferably 20% or higher from the viewpoint of productivity. In addition, in order to promote recrystallization during annealing after cold rolling, the cold-rolling reduction is preferably 50% or higher. In addition, when the cold-rolling reduction is higher than 95%, cracking may occur during cold rolling. Accordingly, the upper limit of the cold-rolling reduction is preferably 95%.

The annealing temperature after cold rolling is preferably 600° C. or higher in order to sufficiently promote recrystallization and recovery. On the other hand, when the annealing temperature after cold rolling is higher than 1100° C., crystal grains are coarsened, and grain boundary embrittlement may be promoted. Accordingly, the upper limit of the annealing temperature of the cold-rolled steel sheet is preferably 1100° C.

The cooling rate after the annealing of the cold-rolled steel sheet is preferably 20° C./s or faster, and the cooling stop temperature is preferably 450° C. or lower. This is to prevent grain boundary embrittlement, which is caused by the coarsening of crystal grains due to grain growth during cooling and by the segregation of an impurity element such as P in a grain boundary, and to improve ductility. Although the upper limit of the cooling rate is not limited, it is technically difficult to set the upper limit of the cooling rate to be faster than 500° C./sec. In addition, since the lower limit of the cooling stop temperature depends on the temperature of a cooling medium, it is difficult to set the lower limit of the cooling stop temperature to a temperature lower than room temperature.

In order to remove scale produced after cold rolling and annealing, mechanical descaling and/or pickling may be performed. In addition, after cold rolling and annealing, temper-rolling may be performed to correct the shape and to eliminate a yield point. During temper-rolling, when the elongation ratio is lower than 0.2%, the effect is not sufficient. When the elongation ratio is higher than 2%, the yield ratio is significantly increased, and elongation is deteriorated. Accordingly, the elongation ratio during temper-rolling is preferably 0.2% or higher and preferably 2% or lower.

Before hot-dip galvanizing, for example, it is necessary to perform a Ni-preplating treatment on a surface of a hot-rolled steel sheet or a cold-rolled steel sheet that are obtained by the above method as an intermediate treatment. When Ni-preplating is performed on the surface of the steel sheet, the surface of the steel sheet is activated. Therefore, even if a high Al-content steel sheet is used, it is possible to obtain good plating wettability and galvanizing property. However, in order to perform the preferred Ni-preplating treatment on the high Al-content steel sheet, it is necessary to limit the Ti content to a prescribed range as described above.

All of electroplating, immersion plating and spray plating can be used as a method of a Ni-preplating treatment. A plating amount per one-sided surface is 0.2 g/m$^2$ to 2 g/m$^2$. When a Ni-preplating treatment is not performed on the high Al-content steel sheet that is a base metal of the galvanized steel sheet according to an embodiment of the present invention, good plating wettability and galvanizing property cannot be obtained. Furthermore, non-plating is occurred and it is not possible to prevent the degradation in the galvanizing property of the galvanized steel sheet.

In addition, before Ni-preplating treatment, a surface of a hot-rolled steel sheet or cold-rolled steel sheet to which treatment such as annealing or mechanical descaling and/or pickling is performed may be removed by grinding for 0.1 μm or more as necessary. Ni-preplating treatment is performed after 0.1 μm or more of the surface of the steel sheet is removed by grinding, alloying is further promoted during alloying heat treatment after a hot-dip galvanizing treatment is performed. Therefore, a heating temperature during alloying heat treatment can be deteriorated. In addition, although the mechanism by which alloying is promoted is not clear, it is believed that a surface is activated due to an influence of a strain that is introduced to the surface of the steel sheet by grinding.

Brush polishing, sandpaper polishing, mechanical polishing may be used as a method for grinding and removing a portion of the surface of a steel sheet. When the amount that is removed by grinding from the surface of the steel sheet is lower than 0.1 μm, an effect in which alloying is promoted cannot be obtained. In order to obtain the effect in which alloying is further promoted, the amount that is removed by grinding from the surface of the steel sheet is preferably 0.5 μm or more.

After the Ni-preplating treatment is performed, a heating treatment is subjected to the plated steel sheet at a heating rate of 20° C./sec or more to a temperature of 430° C. to 480° C. Next, in the hot-dip galvanizing treatment, the hot-dip galvanizing treatment is performed by immersing the steel sheet into the hot-dip galvanizing bath in which the bath temperature is 440° C. to 470° C., the Al content is 0.1% to 0.4% and the remainder includes Zn and impurities. Then, as necessary, an alloying heat treatment may be performed at a heating temperature of 470° C. to 560° C. for a heating time of 10 seconds to 40 seconds. The hole expandability of the galvanized steel sheet is greatly improved by the alloying heat treatment associated with the hot-dip galvanizing treatment. When the heating rate is slower than 20° C./sec in the hot-dip galvanizing treatment, Ni is diffused to the steel sheet and good galvanizing property cannot be obtained. In addition, when the heating temperature is lower than 430° C. or higher than 480° C. in the hot-dip galvanizing treatment, non-plating is easy to occur during plating. Furthermore, when the heating temperature is lower than 470° C. in the alloying heat treatment, alloying is insufficient, and when the heating temperature is higher than 560° C. in the alloying heat treatment, the hole expandability of the galvanized steel sheet may be deteriorated due to coarsening of carbide. Although an alloying time is determined by a balance between the alloying time and the alloying temperature, the alloying time is suitable in a range of 10 seconds to 40 seconds. When a heating time is shorter than 10 seconds, alloying is not easy to promote, and when a heating time is longer than 40 seconds, the hole expandability of the galvanized steel sheet may be deteriorated due to coarsening of carbide. In addition, even if the alloying heat treatment is not performed, the effect that hole expandability of the galvanized steel is improved can be obtained. However, the alloying heat treatment is performed and it is possible to obtain a greater improvement effect. The reason that the hole expandability is improved by the alloying heat treatment is not clear, a heating treatment for short time at a heating temperature as described above is performed and a part of carbon that is fixed as carbide is moderately solid-soluted and diffused into a grain boundary. Therefore, it is believed that grain boundary strength is improved.

After the hot-dip galvanizing treatment and the alloying heat treatment are performed, temper-rolling is preferable to be performed so as to correct the final shape and so as to eliminate a yield point. During temper-rolling, when the elongation ratio is lower than 0.2%, the effect is not sufficient. When the elongation ratio is higher than 1%, a yield ratio is significantly increased, and elongation is deteriorated. Accordingly, the elongation ratio during temper-rolling is preferably 0.2% to 1%.

Next, methods of analysis for analyzing chemical components of the galvanizing layer (galvanizing layer composition) will be described. Regarding the galvanizing layer composition, the galvanizing layer is dissolved in hydrochloric acid and the mass % of each component in the galvanizing layer is obtained.

EXAMPLES

Hereinafter, the technical content of the present invention will be described in detail using examples of the present invention.

Example 1

Steel having a chemical composition shown in Table 1 was cast at a molten steel superheat temperature of 40° C. and was hot-rolled under conditions shown in Table 2A. After hot rolling, grinding was subjected to a surface of the hot-rolled steel sheet and a Ni-preplating treatment was performed under conditions shown in Table 2A. Furthermore, a hot-dip galvanizing treatment and some with alloying heat treatment were subjected to the Ni-pre plated steel sheet under conditions shown in Table 2A. In addition, in a case where the alloying heat treatment was not performed after hot-dip galvanizing treatment was performed, a galvanizing bath, in which a bath temperature was 460° C. and has Al: 0.2% to 0.4% and the reminder including Zn and impurities as a component composition by mass %, was used. In addition, in a case where the alloying heat treatment was performed, a galvanizing bath, in which a bath temperature was 460° C. and has Al: 0.1% to 0.3% and the reminder including Zn and impurities as a component composition by mass %, was used. The thickness of the hot-rolled steel sheet before plating was 2.3 mm.

The specific gravity, the tensile strength, the hole expandability, the spot weldability, the plating appearance indicated by the presence of non-plating, the composition of the plating layer and the plating adhesion of the obtained hot-dip galvanized steel sheet and galvannealed steel sheet were evaluated. In addition, the hole expandabilities of the hot-rolled steel sheet before plating treatment were evaluated for comparison.

The specific gravity of the galvanized steel sheet was measured using a pycnometer. The tensile strength in the mechanical properties of the galvanized steel sheet was evaluated by performing a tension test according to JIS Z 2241 to measure the tension strength (TS) using No. 5 test piece which was prepared that the longitudinal direction is perpendicular to the rolling direction of the steel sheet. The hole expandability of the galvanized steel sheet was evaluated by performing a hole expanding test according to JFS (Japan Iron and Steel Federation Standard) T 1001 to measure the hole expansion ratio ($\lambda$). TS×$\lambda$ was measured as workability index of the galvanized steel sheet, and results of 30000 MPa·% or more of TS×$\lambda$ were evaluated as "Pass".

The spot weldability of the galvanized steel sheet was evaluated based on the cross tension strength of a resistance spot welded joint according to JIS Z 3137. Spot welding was performed using an ordinary spot welding machine under welding conditions which were adjusted such that a nugget diameter was 5×$\sqrt{t}$ (mm) at a sheet thickness of t (mm).

The plating appearance of the galvanized steel sheet was evaluated by plating or non-plating using visual observation. Regarding the galvanizing layer composition, the galvanizing layer is dissolved in hydrochloric acid and mass % of each component in the galvanizing layer is obtained. Regarding the Fe content of the galvanizing layer, when the Fe content was 7% or more and 15% or less by mass % in the galvanizing layer of the galvannealed steel sheet in which alloying heat treatment was performed, it was determined in which alloying was advanced well. On the other hand, the Fe content of the galvanizing layer of the galvanized steel sheet in which alloying heat treatment was not performed was less than 7%. When the Ni content of the galvanizing layer was 0.05% to 1.0% by mass %, it was evaluated as "Pass". When the Al content of the galvanizing layer was 0.15% to 2.0% by mass %, it was evaluated as "Pass".

Regarding the galvanizing property, a 25 mm cup drawing test was performed and a photographic density was measured by a type test. As a result, when the photographic density was less than 30%, it was evaluated as "Pass".

Tables 2A and 2B show the evaluation results of the specific gravity, the tensile strength (TS), the hole expandability ($\lambda$), TS×$\lambda$, CTS, the plating appearance indicated by the presence of non-plating, the composition of the galvanizing layer and the plating adhesion of the galvanized steel sheet. ACTS of 8.0 kN or higher was evaluated as "Pass" in consideration of the thickness and the tensile strength level of the galvanized steel sheet. In the evaluation items, values which were evaluated as "Poor" are underlined.

Hot-Rolling Nos. 1 to 10 and 16 to 25 were examples according to the present invention, in which all the characteristics were evaluated as "Pass", and a galvanized steel sheet having the desired characteristics was obtained. In addition, the hole expandability of the hot-dip galvanized steel sheet was higher than that of the hot-rolled steel sheet before plating. Furthermore, the hole expandability of the galvannealed steel sheet was higher than that of the hot-rolled steel sheet before plating.

On the other hand, Hot-Rolling Nos. 11 to 15 and 26 to 30 in which the chemical component was not in the range of the present invention and the producing conditions were not in the preferred range of the present invention were comparative examples in which any one of the characteristics was evaluated as "Poor".

[Table 1]
[Table 2A]
[Table 2B]

Example 2

Steel having a chemical composition shown in Table 1 was cast at a molten steel superheat temperature of 40° C. and was hot-rolled under conditions shown in Table 2A. Next, the hot-rolled steel sheet was cold-rolled and annealed under conditions shown in Table 3A. After cold rolling, grinding was subjected to a surface of the cold-rolled steel sheet and a Ni-preplating treatment was performed under conditions shown in Table 3A. Furthermore, a hot-dip galvanizing treatment and some with alloying heat treatment were subjected to the Ni-pre plated steel sheet under conditions shown in Table 3A. In addition, the same galvanizing bath as in Example 1 was used in the hot-dip galvanizing treatment. The thickness of the cold-rolled steel sheet before plating was 1.2 mm.

As well as Example 1, the specific gravity, the tensile strength, the hole expandability, the spot weldability, the plating appearance indicated by the presence of non-plating, the composition of the galvanizing layer and the plating adhesion of the obtained hot-dip galvanized steel sheet and galvannealed steel sheet were evaluated. In addition, the hole expandabilities of the cold-rolled steel sheet before plating treatment were evaluated for comparison.

Tables 3A and 3B show the evaluation results of the specific gravity, the tensile strength (TS), the hole expandability (λ), TS×λ, CTS, the plating appearance indicated by the presence of non-plating, the composition of the galvanizing layer and plating adhesion of the galvanized steel sheet. A CTS of 5 kN or higher was evaluated as "Pass" in consideration of the thickness and the tensile strength level of the galvanized steel sheet. In the evaluation items, values which were evaluated as "Poor" are underlined.

Cold-Rolling Nos. 1 to 10 and 16 to 25 were examples according to the present invention, in which all the characteristics were evaluated as "Pass", and a galvanized steel sheet having desired characteristics was obtained. In addition, the hole expandability of the hot-dip galvanized steel sheet was higher than that of the cold-rolled steel sheet before plating. Furthermore, the hole expandability of the galvannealed steel sheet was higher than that of the cold-rolled steel sheet before plating.

On the other hand, Cold-Rolling Nos. 11 to 15 and 26 to 30 in which the chemical component was not in the range of the present invention and the producing conditions was not in the preferred range of the present invention were comparative examples in which any one of the characteristics was evaluated as "Poor".

[Table 3A]
[Table 3B]

Example 3

Steel having a chemical composition shown in Table 4 was cast at a molten steel superheat temperature of 40° C. and was hot-rolled under conditions shown in Table 5A. After hot rolling, grinding was subjected to a surface of the hot-rolled steel sheet and a Ni-preplating treatment was performed under conditions shown in Table 5A. Furthermore, a hot-dip galvanizing treatment and some with alloying heat treatment were subjected to the Ni-pre plated steel sheet under conditions shown in Table 5A. In addition, the same galvanizing bath as in Example 1 was used in the hot-dip galvanizing treatment. The thickness of the hot-rolled steel sheet before plating was 2.3 mm.

As well as Example 1, the specific gravity, the tensile strength, the hole expandability, the spot weldability, the plating appearance indicated by the presence of non-plating, the composition of the galvanizing layer and the plating adhesion of the obtained hot-dip galvanized steel sheet and galvannealed steel sheet were evaluated. In addition, the hole expandabilities of the hot-rolled steel sheet before plating treatment were evaluated for comparison.

Tables 5A and 5B show the evaluation results of the specific gravity, the tensile strength (TS), the hole expandability (λ), TS×λ, CTS, the plating appearance indicated by the presence of non-plating, the composition of the galvanizing layer, and the plating adhesion of the galvanized steel sheet. A CTS of 10 kN or higher was evaluated as "Pass" in consideration of the thickness and the tensile strength level of the galvanized steel sheet. In the evaluation items, values which were evaluated as "Poor" are underlined.

Hot-Rolling Nos. 31 to 40 and 41 to 50 were examples according to the present invention, in which all the characteristics were evaluated as "Pass", and a plated steel sheet having desired characteristics was obtained. In addition, all the CTS of the Hot-Rolling Nos. 31 to 40 and 41 to 50 were 13 kN or more, and the spot weldability of the galvanized steel sheet was further improved compared with the Hot-Rolling Nos. 1 to 10 and 16 to 25 of Example 1 in which the Mn content of the galvanized steel sheet was more than 0.5%.

[Table 4]
[Table 5A]
[Table 5B]

Example 4

Steel having a chemical composition shown in Table 4 was cast at a molten steel superheat temperature of 40° C. and was hot-rolled under conditions shown in Table 5A. Next, the hot-rolled steel sheet was cold-rolled and annealed under conditions shown in Table 6A. After cold rolling, grinding was subjected to a surface of the cold-rolled steel sheet and a Ni-preplating treatment was performed under the conditions shown in Table 6A. Furthermore, the Ni-pre-plated steel sheet was subjected to a hot-tip galvanizing treatment and some of the Ni-pre-plated steel sheet was subjected to an alloying heat treatment under the conditions shown in Table 6A. In addition, the same galvanizing bath as in Example 1 was used in the hot-dip galvanizing treatment. The thickness of the cold-rolled steel sheet before plating was 1.2 mm.

As well as Example 2, the specific gravity, the tensile strength, the hole expandability, the spot weldability, the plating appearance indicated by the presence of non-plating, the composition of the galvanizing layer and the plating adhesion of the obtained hot-dip galvanized steel sheet and galvannealed steel sheet were evaluated. In addition, the hole expandabilities of the cold-rolled steel sheet before the plating treatment were evaluated for comparison.

Tables 6A and 6B show the evaluation results of the specific gravity, the tensile strength (TS), the hole expandability (λ), TS×λ, CTS, the plating appearance indicated by the presence of non-plating, the composition of the galvanizing layer, and the plating adhesion of the galvanized steel sheet. ACTS of 5.0 kN or higher was evaluated as "Pass" in consideration of the thickness and the tensile strength level of the galvanized steel sheet. In the evaluation items, values which were evaluated as "Poor" are underlined.

Cold-Rolling Nos. 31 to 40 and 41 to 50 were examples according to the present invention, in which all the characteristics were evaluated as "Pass", and a galvanized steel sheet having desired characteristics was obtained. In addition, all the CTS of the Cold-Rolling Nos. 31 to 40 and 41 to 50 were 7 kN or more, and the spot weldability of the galvanized steel sheet was further improved compared with the Cold-Rolling Nos. 1 to 10 and 16 to 25 of Example 2 in which the Mn content of the galvanized steel sheet was more than 0.5%.

[Table 6A]
[Table 6B]

INDUSTRIAL APPLICABILITY

According to the present invention, a high-strength low-specific-gravity galvanized steel sheet having high producibility, superior galvanizing property and hole expandability can be obtained, which remarkably contributes to the industry.

TABLE 1

| STEEL NO. | CHEMICAL COMPOSITION (mass %) | | | | | | | | | |
|---|---|---|---|---|---|---|---|---|---|---|
| | C | Si | Mn | P | S | Al | N | Ti | Nb | V |
| A | 0.107 | 0.02 | 1.45 | 0.0092 | 0.0019 | 4.5 | 0.0058 | 0.402 | | |
| B | 0.114 | 0.03 | 1.28 | 0.0073 | 0.0015 | 4.2 | 0.0045 | 0.382 | 0.02 | |
| C | 0.121 | 0.05 | 1.53 | 0.0085 | 0.0027 | 4.7 | 0.0037 | 0.347 | | |
| D | 0.156 | 0.04 | 1.16 | 0.0126 | 0.0018 | 4.4 | 0.0063 | 0.415 | | |
| E | 0.218 | 0.09 | 0.62 | 0.0136 | 0.0007 | 5.9 | 0.0038 | 0.523 | 0.03 | 0.12 |
| F | 0.185 | 0.02 | 1.85 | 0.0068 | 0.0023 | 7.7 | 0.0072 | 0.345 | | |
| G | 0.327 | 0.06 | 0.82 | 0.0081 | 0.0019 | 6.5 | 0.0056 | 0.437 | | |
| H | 0.134 | 0.10 | 1.24 | 0.0063 | 0.0026 | 4.1 | 0.0061 | 0.175 | | |
| I | 0.027 | 1.86 | 1.27 | 0.0147 | 0.0149 | 7.8 | 0.0046 | 0.152 | | |
| J | 0.583 | 0.56 | 0.73 | 0.0162 | 0.0072 | 8.2 | 0.0038 | 0.043 | 0.02 | |
| K | 0.005 | 0.31 | 0.52 | 0.0264 | 0.0063 | 9.5 | 0.0134 | 1.610 | | 0.15 |
| L | 0.158 | 0.17 | 2.83 | 0.0118 | 0.0081 | 12.5 | 0.0048 | 0.024 | | |
| M | 0.048 | 2.62 | 0.13 | 0.0172 | 0.0231 | 8.3 | 0.0019 | 0.135 | | |

| STEEL NO. | CHEMICAL COMPOSITION (mass %) | | | | | | | | | | RE-MARKS |
|---|---|---|---|---|---|---|---|---|---|---|---|
| | Cr | Mo | Ni | Cu | B | Ca | Mg | REM | Zr | C + Ti | Al × Si | |
| A | | | | | | | | | | 0.509 | 0.090 | EXAMPLES |
| B | | | | | | | | | | 0.496 | 0.126 | |
| C | 0.2 | | | | | | | | | 0.468 | 0.235 | |
| D | | | | | 0.0012 | | | | | 0.571 | 0.176 | |
| E | | | | | | | 0.0025 | | | 0.741 | 0.531 | |
| F | | 0.10 | | 0.20 | | | | 0.0048 | | 0.530 | 0.154 | |
| G | | 0.20 | | | | 0.0035 | | | | 0.764 | 0.390 | |
| H | | | | | 0.0015 | | | | 0.0134 | 0.309 | 0.410 | |
| I | | | | | 0.0018 | | | | | 0.179 | 14.508 | COMPARATIVE EXAMPLE |
| J | 0.30 | | | | | | | | | 0.626 | 4.592 | |
| K | | | | | | 0.0036 | | | | 1.615 | 2.945 | |
| L | | | 0.20 | 0.40 | | 0.0018 | | | | 0.182 | 2.215 | |
| M | | 0.10 | | | | | | | | 0.183 | 21.746 | |

(Note)
Underlined values were not in the range of the present invention.

TABLE 2A

| HOT-ROLLING NO. | STEEL NO. | HOT-ROLLING CONDITIONS | | | CHARACTERISTICS OF HOT-ROLLED STEEL SHEET | INTERMEDIATE TREATMENT CONDITIONS | | GALVANIZING CONDITIONS | | ALLOYING TREATMENT | | SPECIFIC GRAVITY |
|---|---|---|---|---|---|---|---|---|---|---|---|---|
| | | HEATING TEMPERATURE (° C.) | FINISH TEMPERATURE (° C.) | COILING TEMPERATURE (° C.) | HOLE EXPANDABILITY (λ) (%) | GRINDING AMOUNT OF SURFACE (μM) | PLATING AMOUNT OF Ni (g/m²) | HEATING RATE (° C./sec) | HEATING TEMPERATURE (° C.) | ALLOYING TREATMENT TEMPERATURE (° C.) | ALLOYING TREATMENT TIME (sec) | |
| 1 | A | 1150 | 850 | 700 | 85 | 1.0 | 0.5 | 30 | 460 | 520 | 15 | 7.27 |
| 2 | B | 1170 | 880 | 720 | 89 | 0.5 | 0.3 | 40 | 470 | 520 | 15 | 7.30 |
| 3 | C | 1160 | 850 | 700 | 87 | 0.7 | 0.6 | 30 | 460 | 520 | 20 | 7.25 |
| 4 | D | 1150 | 840 | 710 | 95 | 1.0 | 0.7 | 50 | 480 | 510 | 15 | 7.28 |
| 5 | E | 1230 | 870 | 740 | 81 | 0.2 | 1.2 | 30 | 460 | 530 | 15 | 7.13 |
| 6 | F | 1150 | 850 | 700 | 83 | 0.8 | 0.5 | 30 | 460 | 540 | 15 | 6.97 |
| 7 | G | 1170 | 880 | 720 | 84 | 1.0 | 0.4 | 40 | 470 | 530 | 15 | 7.01 |

TABLE 2A-continued

| HOT-ROLL-ING NO. | STEEL NO. | HOT-ROLLING CONDITIONS ||| CHARACTERISTICS OF HOT-ROLLED STEEL SHEET | INTERMEDIATE TREATMENT CONDITIONS || GALVANIZING CONDITIONS |||| SPECIFIC GRAVITY |
|---|---|---|---|---|---|---|---|---|---|---|---|---|
| | | HEATING TEMPERATURE (° C.) | FINISH TEMPERATURE (° C.) | COILING TEMPERATURE (° C.) | HOLE EXPANDABILITY (λ) (%) | GRINDING AMOUNT OF SURFACE (μM) | PLATING AMOUNT OF Ni (g/m²) | HEATING RATE (° C./sec) | HEATING TEMPERATURE (° C.) | ALLOYING TREATMENT TEMPERATURE (° C.) | ALLOYING TREATMENT TIME (sec) | |
| 8 | H | 1160 | 850 | 700 | 99 | 1.2 | 0.6 | 30 | 460 | 520 | 30 | 7.31 |
| 9 | A | 1150 | 840 | 710 | 75 | — | 1.3 | 30 | 460 | 550 | 15 | 7.27 |
| 10 | A | 1210 | 920 | 730 | 76 | — | 1.1 | 30 | 460 | 550 | 15 | 7.27 |
| 11 | <u>I</u> | 1150 | 840 | 630 | 31 | — | — | 30 | 460 | 560 | <u>45</u> | 6.98 |
| 12 | <u>J</u> | 1160 | 860 | 640 | 27 | — | — | <u>10</u> | 470 | <u>570</u> | 15 | 6.86 |
| 13 | <u>K</u> | 1140 | 830 | 700 | 30 | — | 0.3 | 30 | <u>490</u> | <u>580</u> | 30 | 6.91 |
| 14 | <u>L</u> | 1150 | 840 | 660 | 31 | 1.0 | 0.5 | 50 | 480 | 560 | 15 | 6.67 |
| 15 | <u>M</u> | 1130 | 830 | 730 | 33 | 1.0 | 0.5 | 30 | 460 | 560 | 15 | 6.82 |
| 16 | A | 1150 | 850 | 700 | 85 | 1.0 | 0.5 | 30 | 460 | — | — | 7.27 |
| 17 | B | 1170 | 880 | 720 | 89 | 0.5 | 0.3 | 40 | 470 | — | — | 7.30 |
| 18 | C | 1160 | 850 | 700 | 87 | 0.7 | 0.6 | 30 | 460 | — | — | 7.25 |
| 19 | D | 1150 | 840 | 710 | 95 | 1.0 | 0.7 | 50 | 480 | — | — | 7.28 |
| 20 | E | 1230 | 870 | 740 | 81 | 0.2 | 1.2 | 30 | 460 | — | — | 7.13 |
| 21 | F | 1110 | 820 | 620 | 83 | 0.8 | 0.5 | 30 | 460 | — | — | 6.97 |
| 22 | G | 1160 | 840 | 640 | 84 | 1.0 | 0.4 | 40 | 470 | — | — | 7.01 |
| 23 | H | 1140 | 850 | 710 | 99 | 1.2 | 0.6 | 30 | 460 | — | — | 7.31 |
| 24 | A | 1130 | 840 | 680 | 75 | — | 1.3 | 30 | 460 | — | — | 7.27 |
| 25 | A | 1210 | 920 | 730 | 76 | — | 1.1 | 30 | 460 | — | — | 7.27 |
| 26 | <u>I</u> | 1150 | 840 | 630 | 31 | — | — | 30 | 460 | — | — | 6.98 |
| 27 | <u>J</u> | 1160 | 860 | 640 | 27 | — | — | <u>10</u> | 470 | — | — | 6.86 |
| 28 | <u>K</u> | 1140 | 830 | 700 | 30 | — | 0.3 | 30 | <u>490</u> | — | — | 6.91 |
| 29 | <u>L</u> | 1150 | 840 | 660 | 31 | 1.0 | 0.5 | 50 | 480 | — | — | 6.67 |
| 30 | <u>M</u> | 1130 | 830 | 730 | 33 | 1.0 | 0.5 | 30 | 460 | — | — | 6.82 |

(Note)
Underlined steels in Steel No. were not in the range of the present invention, and underlined values in other items were conditions or properties which were not in the preferable range.

TABLE 2B

| HOT ROLLING NO. | STEEL NO. | MECHANICAL PROPERTIES ||| GALVANIZING PROPERTIES |||||| REMARKS |
|---|---|---|---|---|---|---|---|---|---|---|---|
| | | TENSILE STRENGTH (TS) (MPa) | HOLE EXPANDABILITY (λ) (%) | TS × λ (MPa · %) | SPOT WELDABILITY CTS (kN) | PRESENCE OF NON-PLATING | COMPOSITION OF GALVANIZING LAYER |||| |
| | | | | | | | Fe (%) | Ni (%) | Al (%) | Zn AND IMPURITIES (%) | PLATING ADHESION |
| 1 | A | 484 | 106 | 51304 | 9.2 | NO | 11.2 | 0.3 | 0.4 | 88.1 | ○ | EXAMPLES |
| 2 | B | 465 | 109 | 50685 | 9.0 | NO | 10.7 | 0.2 | 0.5 | 88.6 | ○ | |
| 3 | C | 496 | 108 | 53568 | 9.8 | NO | 11.0 | 0.5 | 0.6 | 87.9 | ○ | |
| 4 | D | 475 | 115 | 54625 | 9.3 | NO | 10.8 | 0.5 | 0.4 | 88.3 | ○ | |
| 5 | E | 516 | 102 | 52632 | 9.1 | NO | 10.5 | 0.8 | 0.7 | 88.0 | ○ | |
| 6 | F | 562 | 103 | 57886 | 9.4 | NO | 10.4 | 0.4 | 1.0 | 88.2 | ○ | |
| 7 | G | 543 | 105 | 57015 | 9.9 | NO | 10.2 | 0.2 | 0.9 | 88.7 | ○ | |
| 8 | H | 487 | 125 | 60875 | 9.8 | NO | 11.6 | 0.5 | 0.3 | 87.6 | ○ | |
| 9 | A | 503 | 101 | 50803 | 9.5 | NO | 11.4 | 0.9 | 0.5 | 87.2 | ○ | |
| 10 | A | 515 | 100 | 51500 | 9.8 | NO | 11.7 | 0.7 | 0.4 | 87.2 | ○ | |
| 11 | <u>I</u> | 562 | <u>36</u> | <u>20232</u> | <u>4.8</u> | YES | <u>6.3</u> | <u>0.0</u> | 0.7 | 93.0 | x | COMPARATIVE EXAMPLE |
| 12 | <u>J</u> | 692 | <u>31</u> | <u>21452</u> | <u>2.9</u> | YES | <u>5.8</u> | <u>0.0</u> | 0.8 | 93.4 | x | |
| 13 | <u>K</u> | 581 | <u>35</u> | <u>20335</u> | <u>4.5</u> | YES | <u>5.5</u> | 0.2 | 0.9 | 93.4 | x | |
| 14 | <u>L</u> | 553 | <u>35</u> | <u>19355</u> | <u>2.6</u> | YES | <u>4.2</u> | 0.3 | <u>2.1</u> | 93.4 | x | |
| 15 | <u>M</u> | 546 | <u>38</u> | <u>20748</u> | <u>4.8</u> | YES | <u>5.2</u> | 0.3 | 0.8 | 93.7 | x | |
| 16 | A | 487 | 96 | 46752 | 8.3 | NO | 1.7 | 0.3 | 0.3 | 97.7 | ○ | EXAMPLES |
| 17 | B | 469 | 98 | 45962 | 8.1 | NO | 1.9 | 0.2 | 0.4 | 97.5 | ○ | |
| 18 | C | 499 | 98 | 48902 | 8.7 | NO | 2.4 | 0.5 | 0.5 | 96.6 | ○ | |
| 19 | D | 479 | 104 | 49816 | 8.2 | NO | 1.5 | 0.5 | 0.3 | 97.7 | ○ | |
| 20 | E | 519 | 92 | 47748 | 8.4 | NO | 1.3 | 0.8 | 0.6 | 97.3 | ○ | |
| 21 | F | 566 | 91 | 51506 | 8.2 | NO | 2.1 | 0.4 | 0.9 | 96.6 | ○ | |
| 22 | G | 546 | 95 | 51870 | 8.8 | NO | 1.4 | 0.2 | 0.8 | 97.6 | ○ | |
| 23 | H | 591 | 114 | 67374 | 8.6 | NO | 2.0 | 0.5 | 0.2 | 97.3 | ○ | |

TABLE 2B-continued

| | | MECHANICAL PROPERTIES | | | SPOT WELD- ABIL- ITY CTS (kN) | PRES- ENCE OF NON- PLAT- ING | GALVANIZING PROPERTIES | | | | | |
|---|---|---|---|---|---|---|---|---|---|---|---|---|
| | | | | | | | COMPOSITION OF GALVANIZING LAYER | | | | | |
| HOT ROLL- ING NO. | STEEL NO. | TENSILE STRENGTH (TS) (MPa) | HOLE EXPAND- ABILITY (λ) (%) | TS × λ (MPa · %) | | | Fe (%) | Ni (%) | Al (%) | Zn AND IMPU- RITIES (%) | PLAT- ING ADHE- SION | RE- MARKS |
| 24 | A | 506 | 86 | 43516 | 8.4 | NO | 1.5 | 0.9 | 0.4 | 97.2 | ○ | |
| 25 | A | 519 | 85 | 44115 | 8.7 | NO | 2.3 | 0.7 | 0.3 | 96.7 | ○ | |
| 26 | I | 565 | 26 | 14690 | 4.4 | YES | 2.0 | 0.0 | 0.6 | 97.4 | x | COMPAR- |
| 27 | J | 596 | 20 | 11920 | 2.6 | YES | 1.3 | 0.0 | 0.7 | 98.0 | x | ATIVE |
| 28 | K | 584 | 25 | 14600 | 4.1 | YES | 2.1 | 0.2 | 0.8 | 96.9 | x | EXAM- |
| 29 | L | 557 | 24 | 13368 | 2.3 | YES | 2.3 | 0.3 | 2.1 | 95.3 | x | PLE |
| 30 | M | 549 | 28 | 15372 | 4.5 | YES | 1.5 | 0.3 | 0.7 | 97.5 | x | |

(Note)
Underlined steels in Steel No. were not in the range of the present invention, and underlined values in other items were conditions or properties which were not in the preferable range.

TABLE 3A

| COLD- ROLL- ING NO. | STEEL NO. | HOT- ROLL- ING NO. | COLD- ROLL- ING CONDI- TIONS COLD- ROLL- ING REDUC- TION (%) | ANNEALING CONDITIONS OF COLD-ROLLED STEEL SHEET | | | CHARAC- TERIS- TICS OF COLD- ROLLED STEEL SHEET HOLE EXPAND- ABILITY (λ) (%) | INTERMEDIATE TREATMENT CONDITIONS | |
|---|---|---|---|---|---|---|---|---|---|
| | | | | ANNEAL- ING TEMPER- ATURE (° C.) | COOL- ING RATE (° C./sec) | COOLING STOP TEMPER- ATURE (° C.) | | GRIND- ING AMOUNT OF SUR- FACE (μm) | PLATING AMOUNT OF Ni (g/m²) |
| 1 | A | 1 | 50 | 840 | 50 | 25 | 73 | 1.0 | 0.3 |
| 2 | B | 2 | 50 | 850 | 70 | 35 | 77 | 0.6 | 0.5 |
| 3 | C | 3 | 50 | 860 | 60 | 25 | 75 | 0.7 | 0.6 |
| 4 | D | 4 | 50 | 850 | 50 | 40 | 83 | 1.2 | 0.8 |
| 5 | E | 5 | 50 | 870 | 40 | 50 | 70 | 0.3 | 1.3 |
| 6 | F | 6 | 50 | 860 | 60 | 25 | 71 | 0.7 | 0.4 |
| 7 | G | 7 | 50 | 900 | 80 | 60 | 72 | 1.0 | 0.6 |
| 8 | H | 8 | 50 | 830 | 90 | 50 | 92 | 1.4 | 0.5 |
| 9 | A | 1 | 50 | 860 | 40 | 80 | 62 | — | 1.2 |
| 10 | A | 1 | 50 | 840 | 60 | 60 | 61 | — | 1.4 |
| 11 | I | 11 | 50 | 840 | 50 | 50 | 29 | — | — |
| 12 | J | 12 | 50 | 820 | 60 | 40 | 26 | — | — |
| 13 | K | 13 | 50 | 850 | 40 | 80 | 28 | — | 0.3 |
| 14 | L | 14 | 50 | 830 | 50 | 70 | 29 | 1.2 | 0.6 |
| 15 | M | 15 | 50 | 870 | 30 | 120 | 31 | 1.0 | 0.5 |
| 16 | A | 16 | 50 | 840 | 50 | 25 | 73 | 1.0 | 0.3 |
| 17 | B | 17 | 50 | 850 | 70 | 35 | 77 | 0.6 | 0.5 |
| 18 | C | 18 | 50 | 860 | 60 | 25 | 75 | 0.7 | 0.6 |
| 19 | D | 19 | 50 | 850 | 50 | 40 | 83 | 1.2 | 0.8 |
| 20 | E | 20 | 50 | 870 | 40 | 50 | 70 | 0.3 | 1.3 |
| 21 | F | 21 | 50 | 860 | 60 | 25 | 71 | 0.7 | 0.4 |
| 22 | G | 22 | 50 | 900 | 80 | 60 | 72 | 1.0 | 0.6 |
| 23 | H | 23 | 50 | 830 | 90 | 50 | 92 | 1.4 | 0.5 |
| 24 | A | 16 | 50 | 860 | 40 | 80 | 62 | — | 1.2 |
| 25 | A | 16 | 50 | 840 | 60 | 60 | 61 | — | 1.4 |
| 26 | I | 26 | 50 | 840 | 50 | 50 | 29 | — | — |
| 27 | J | 27 | 50 | 820 | 60 | 40 | 26 | — | — |
| 28 | K | 28 | 50 | 850 | 40 | 80 | 28 | — | 0.3 |
| 29 | L | 29 | 50 | 830 | 50 | 70 | 29 | 1.2 | 0.6 |
| 30 | M | 30 | 50 | 870 | 30 | 120 | 31 | 1.0 | 0.5 |

TABLE 3A-continued

| | | GALVANIZING CONDITIONS | | | | |
|---|---|---|---|---|---|---|
| COLD-ROLLING NO. | HEATING RATE (° C./sec) | HEATING TEMPERATURE (° C.) | ALLOYING TREATMENT TEMPERATURE (° C.) | ALLOYING TREATMENT TIME (sec) | SPECIFIC GRAVITY | |
| 1 | 30 | 460 | 520 | 15 | 7.27 | |
| 2 | 50 | 480 | 520 | 15 | 7.30 | |
| 3 | 30 | 460 | 520 | 20 | 7.25 | |
| 4 | 40 | 470 | 510 | 15 | 7.28 | |
| 5 | 30 | 460 | 530 | 15 | 7.13 | |
| 6 | 40 | 470 | 540 | 15 | 6.97 | |
| 7 | 30 | 460 | 530 | 15 | 7.01 | |
| 8 | 30 | 460 | 520 | 30 | 7.31 | |
| 9 | 40 | 460 | 550 | 15 | 7.27 | |
| 10 | 30 | 460 | 550 | 15 | 7.27 | |
| 11 | 30 | 460 | 560 | <u>45</u> | 6.98 | |
| 12 | <u>10</u> | 470 | <u>570</u> | 15 | 6.86 | |
| 13 | 40 | <u>500</u> | <u>580</u> | 30 | 6.91 | |
| 14 | 50 | 470 | 560 | 15 | 6.67 | |
| 15 | 30 | 460 | 560 | 15 | 6.82 | |
| 16 | 30 | 460 | — | — | 7.27 | |
| 17 | 50 | 480 | — | — | 7.30 | |
| 18 | 30 | 460 | — | — | 7.25 | |
| 19 | 40 | 470 | — | — | 7.28 | |
| 20 | 30 | 460 | — | — | 7.13 | |
| 21 | 40 | 470 | — | — | 6.97 | |
| 22 | 30 | 460 | — | — | 7.01 | |
| 23 | 30 | 460 | — | — | 7.31 | |
| 24 | 40 | 460 | — | — | 7.27 | |
| 25 | 30 | 460 | — | — | 7.27 | |
| 26 | 30 | 460 | — | — | 6.98 | |
| 27 | <u>10</u> | 470 | — | — | 6.86 | |
| 28 | 40 | <u>500</u> | — | — | 6.91 | |
| 29 | 50 | 470 | — | — | 6.67 | |
| 30 | 30 | 460 | — | — | 6.82 | |

(Note)
Underlined steels in Steel No. were not in the range of the present invention, and underlined values in other items were conditions or properties which were not in the preferable range.

TABLE 3B

| COLD ROLLING NO. | STEEL NO. | MECHANICAL PROPERTIES | | | SPOT WELD-ABILITY CTS (kN) | PRESENCE OF NON-PLATING | COMPOSITION OF GALVANIZING LAYER | | | | PLATING ADHESION | REMARKS |
|---|---|---|---|---|---|---|---|---|---|---|---|---|
| | | TENSILE STRENGTH (TS) (MPa) | HOLE EXPANDABILITY (λ) (%) | TS × λ (MPa · %) | | | Fe (%) | Ni (%) | Al (%) | Zn AND IMPURITIES (%) | | |
| 1 | A | 518 | 103 | 53354 | 5.7 | NO | 11.4 | 0.2 | 0.3 | 88.1 | ○ | EXAMPLES |
| 2 | B | 500 | 107 | 53500 | 5.6 | NO | 10.9 | 0.3 | 0.4 | 88.4 | ○ | |
| 3 | C | 530 | 105 | 55650 | 5.9 | NO | 11.2 | 0.5 | 0.5 | 87.8 | ○ | |
| 4 | D | 510 | 113 | 57630 | 5.6 | NO | 10.9 | 0.5 | 0.3 | 88.3 | ○ | |
| 5 | E | 551 | 100 | 55100 | 5.5 | NO | 10.7 | 0.8 | 0.6 | 87.9 | ○ | |
| 6 | F | 596 | 101 | 60196 | 5.7 | NO | 10.6 | 0.3 | 0.9 | 88.2 | ○ | |
| 7 | G | 578 | 102 | 58956 | 5.9 | NO | 10.4 | 0.4 | 0.8 | 88.4 | ○ | |
| 8 | H | 521 | 122 | 63562 | 5.8 | NO | 11.8 | 0.3 | 0.2 | 87.7 | ○ | |
| 9 | A | 538 | 92 | 49496 | 5.8 | NO | 11.6 | 0.8 | 0.4 | 87.2 | ○ | |
| 10 | A | 549 | 91 | 49959 | 5.9 | NO | 11.8 | 0.9 | 0.3 | 87.0 | ○ | |
| 11 | <u>I</u> | 597 | <u>34</u> | <u>20298</u> | <u>3.2</u> | <u>YES</u> | <u>6.5</u> | <u>0.0</u> | 0.6 | 92.9 | <u>x</u> | COMPARATIVE EXAMPLE |
| 12 | <u>J</u> | 726 | <u>31</u> | <u>22506</u> | <u>1.9</u> | <u>YES</u> | <u>5.9</u> | <u>0.0</u> | 0.7 | 93.4 | <u>x</u> | |
| 13 | <u>K</u> | 516 | <u>33</u> | <u>17028</u> | <u>3.3</u> | <u>YES</u> | <u>5.7</u> | 0.2 | 0.8 | 93.3 | <u>x</u> | |
| 14 | <u>L</u> | 587 | <u>34</u> | <u>19958</u> | <u>1.8</u> | <u>YES</u> | <u>4.4</u> | 10.4 | <u>2.1</u> | 93.1 | <u>x</u> | |
| 15 | <u>M</u> | 581 | <u>36</u> | <u>20916</u> | <u>3.5</u> | <u>YES</u> | <u>5.4</u> | 0.3 | 0.7 | 93.6 | <u>x</u> | |
| 16 | A | 521 | 94 | 48974 | 5.2 | NO | 1.8 | 0.2 | 0.2 | 97.8 | ○ | EXAMPLES |
| 17 | B | 504 | 95 | 47880 | 5.1 | NO | 2.0 | 0.3 | 0.3 | 97.4 | ○ | |
| 18 | C | 532 | 96 | 51072 | 5.4 | NO | 2.5 | 0.5 | 0.4 | 96.6 | ○ | |
| 19 | D | 514 | 101 | 51914 | 5.2 | NO | 1.7 | 0.5 | 0.2 | 97.6 | ○ | |
| 20 | E | 553 | 91 | 50323 | 5.1 | NO | 1.5 | 0.8 | 0.5 | 97.2 | ○ | |
| 21 | F | 601 | 90 | 54090 | 5.2 | NO | 2.2 | 0.3 | 0.8 | 96.7 | ○ | |

TABLE 3B-continued

| | | MECHANICAL PROPERTIES | | | SPOT WELD-ABIL-ITY CTS (kN) | PRES-ENCE OF NON-PLAT-ING | COMPOSITION OF GALVANIZING LAYER | | | | | |
|---|---|---|---|---|---|---|---|---|---|---|---|---|
| COLD ROLL-ING NO. | STEEL NO. | TENSILE STRENGTH (TS) (MPa) | HOLE EXPAND-ABILITY (λ) (%) | TS × λ (MPa · %) | | | Fe (%) | Ni (%) | Al (%) | Zn AND IMPU-RITIES (%) | PLAT-ING ADHE-SION | REMARKS |
| 22 | G | 581 | 92 | 53452 | 5.4 | NO | 1.6 | 0.4 | 0.7 | 97.3 | ○ | |
| 23 | H | 625 | 111 | 69375 | 5.3 | NO | 2.1 | 0.3 | 0.2 | 97.4 | ○ | |
| 24 | A | 541 | 83 | 44903 | 5.3 | NO | 1.7 | 0.8 | 0.4 | 97.1 | ○ | |
| 25 | A | 554 | 82 | 45428 | 5.4 | NO | 2.4 | 0.9 | 0.3 | 96.4 | ○ | |
| 26 | I | 601 | 32 | 19232 | 2.8 | YES | 2.1 | 0.0 | 0.5 | 97.4 | x | COMPAR- |
| 27 | J | 630 | 30 | 18900 | 1.7 | YES | 1.5 | 0.0 | 0.6 | 97.9 | x | ATIVE |
| 28 | K | 619 | 32 | 19808 | 2.9 | YES | 2.2 | 0.2 | 0.7 | 96.9 | x | EXAM- |
| 29 | L | 601 | 33 | 19833 | 1.5 | YES | 2.4 | 0.4 | 2.1 | 95.1 | x | PLE |
| 30 | M | 584 | 34 | 19856 | 3.1 | YES | 1.6 | 0.3 | 0.6 | 97.5 | x | |

(Note)
Underlined steels in Steel No. were not in the range of the present inventon, and underlined values in other items were conditions or properties which were not in the preferable range.

TABLE 4

| | CHEMICAL COMPOSITION (mass %) | | | | | | | | | | | |
|---|---|---|---|---|---|---|---|---|---|---|---|---|
| STEEL NO. | C | Si | Mn | P | S | Al | N | Ti | Nb | V | Cr | Mo |
| N | 0.115 | 0.03 | 0.32 | 0.0048 | 0.0016 | 4.3 | 0.0032 | 0.413 | | | | |
| O | 0.109 | 0.05 | 0.21 | 0.0042 | 0.0018 | 4.4 | 0.0053 | 0.396 | 0.02 | | | |
| P | 0.127 | 0.07 | 0.48 | 0.0035 | 0.0032 | 14.8 | 0.0042 | 0.352 | | | 0.20 | |
| Q | 0.143 | 0.04 | 0.35 | 0.0046 | 0.0025 | 4.5 | 0.0061 | 0.401 | | | | |
| R | 0.211 | 0.08 | 0.27 | 0.0038 | 0.0008 | 5.6 | 0.0045 | 0.516 | 0.01 | 0.13 | | |
| S | 0.174 | 0.05 | 0.44 | 0.0027 | 0.0017 | 7.5 | 0.0068 | 0.362 | | | | |
| T | 0.315 | 0.07 | 0.38 | 0.0049 | 0.0025 | 6.3 | 0.0051 | 0.452 | | | | 0.10 |
| U | 0.126 | 0.12 | 0.42 | 0.0032 | 0.0015 | 4.2 | 0.0038 | 0.163 | | | | |

| | CHEMICAL COMPOSITION (mass %) | | | | | | | | | RE-MARKS |
|---|---|---|---|---|---|---|---|---|---|---|
| STEEL NO. | Ni | Cu | B | Ca | Mg | REM | Zr | C + Ti | Al × Si | |
| N | | | | | | | | 0.528 | 0.129 | EXAM-PLES |
| O | | | | | | | | 0.505 | 0.220 | |
| P | | | | | | | | 0.479 | 0.336 | |
| Q | | | 0.0013 | | | | | 0.544 | 0.180 | |
| R | | | | | 0.0028 | | | 0.727 | 0.448 | |
| S | 0.10 | 0.20 | | | | 0.0042 | | 0.536 | 0.375 | |
| T | | | | 0.0031 | | | | 0.767 | 0.441 | |
| U | | | 0.0016 | | | | 0.0117 | 0.289 | 0.504 | |

TABLE 5A

| | | CHARAC-TERISTICS OF HOT-ROLLED STEEL SHEET | INTERMEDIATE TREATMENT CONDITIONS | | GALVANIZING CONDITIONS | | | | |
|---|---|---|---|---|---|---|---|---|---|
| | HOT ROLLING CONDITIONS | | | | | | ALLOY-ING | | |
| HOT ROLL-ING NO. | STEEL NO. | HEATING TEMPER-ATURE (° C.) | FINISH TEMPER-ATURE (° C.) | COILING TEMPER-ATURE (° C.) | HOLE EXPAND-ABILITY (λ) (%) | GRIND-ING AMOUNT OF SUR-FACE (μm) | PLATING AMOUNT OF Ni (g/m²) | HEAT-ING RATE (° C./sec) | HEAT-ING TEM-PERA-TURE (° C.) | TREAT-MENT TEM-PERA-TURE (° C.) | ALLOY-ING TREAT-MENT TIME (sec) | SPE-CIFIC GRAV-ITY |
| 31 | N | 1160 | 840 | 720 | 88 | 0.8 | 0.4 | 40 | 470 | 520 | 15 | 7.29 |
| 32 | O | 1150 | 870 | 700 | 92 | 1.0 | 0.5 | 30 | 460 | 510 | 20 | 7.28 |
| 33 | P | 1170 | 860 | 710 | 90 | 0.7 | 0.3 | 50 | 480 | 520 | 15 | 7.24 |
| 34 | Q | 1160 | 850 | 690 | 98 | 1.2 | 0.6 | 30 | 470 | 510 | 15 | 7.27 |
| 35 | R | 1220 | 880 | 740 | 84 | 0.3 | 1.1 | 40 | 460 | 520 | 20 | 7.10 |
| 36 | S | 1120 | 830 | 630 | 87 | 0.9 | 0.4 | 50 | 470 | 540 | 15 | 6.99 |

TABLE 5A-continued

| | | HOT ROLLING CONDITIONS | | | CHARACTERISTICS OF HOT-ROLLED STEEL SHEET | INTERMEDIATE TREATMENT CONDITIONS | | GALVANIZING CONDITIONS | | ALLOYING | | |
|---|---|---|---|---|---|---|---|---|---|---|---|---|
| HOT ROLLING NO. | STEEL NO. | HEATING TEMPERATURE (° C.) | FINISH TEMPERATURE (° C.) | COILING TEMPERATURE (° C.) | HOLE EXPANDABILITY (λ) (%) | GRINDING AMOUNT OF SURFACE (μm) | PLATING AMOUNT OF Ni (g/m²) | HEATING RATE (° C./sec) | HEATING TEMPERATURE (° C.) | ALLOYING TREATMENT TEMPERATURE (° C.) | ALLOYING TREATMENT TIME (sec) | SPECIFIC GRAVITY |
| 37 | T | 1180 | 860 | 660 | 88 | 0.8 | 0.5 | 30 | 460 | 530 | 15 | 7.10 |
| 38 | U | 1130 | 840 | 700 | 99 | 1.3 | 0.6 | 30 | 460 | 520 | 25 | 7.29 |
| 39 | N | 1150 | 850 | 690 | 79 | — | 1.1 | 40 | 470 | 560 | 15 | 7.29 |
| 40 | N | 1230 | 930 | 740 | 80 | — | 1.5 | 30 | 460 | 550 | 15 | 7.29 |
| 41 | N | 1160 | 840 | 720 | 88 | 0.8 | 0.4 | 40 | 470 | — | — | 7.29 |
| 42 | O | 1150 | 870 | 700 | 92 | 1.0 | 0.5 | 30 | 460 | — | — | 7.28 |
| 43 | P | 1170 | 860 | 710 | 90 | 0.7 | 0.3 | 50 | 480 | — | — | 7.24 |
| 44 | Q | 1160 | 850 | 690 | 98 | 1.2 | 0.6 | 30 | 470 | — | — | 7.27 |
| 45 | R | 1220 | 880 | 740 | 84 | 0.3 | 1.1 | 40 | 460 | — | — | 7.10 |
| 46 | S | 1120 | 830 | 630 | 87 | 0.9 | 0.4 | 50 | 470 | — | — | 6.99 |
| 47 | T | 1180 | 860 | 660 | 88 | 0.8 | 0.5 | 30 | 460 | — | — | 7.10 |
| 48 | U | 1130 | 840 | 700 | 99 | 1.3 | 0.6 | 30 | 460 | — | — | 7.29 |
| 49 | N | 1150 | 850 | 690 | 79 | — | 1.1 | 40 | 470 | — | — | 7.29 |
| 50 | N | 1230 | 930 | 740 | 80 | — | 1.5 | 30 | 460 | — | — | 7.29 |

TABLE 5B

| | | MECHANICAL PROPERTIES | | | GALVANIZING PROPERTIES | | | | | | | |
|---|---|---|---|---|---|---|---|---|---|---|---|---|
| | | | | | SPOT WELDABILITY CTS (kN) | PRESENCE OF NON-PLATING | COMPOSITION OF GALVANIZING LAYER | | | | | |
| HOT ROLLING NO. | STEEL NO. | TENSILE STRENGTH (TS) (MPa) | HOLE EXPANDABILITY (λ) (%) | TS × λ (MPa · %) | | | Fe (%) | Ni (%) | Al (%) | Zn AND IMPURITIES (%) | PLATING ADHESION | REMARKS |
| 31 | N | 454 | 111 | 50394 | 14.3 | NO | 10.8 | 0.2 | 0.3 | 88.7 | ○ | EXAMPLES |
| 32 | O | 437 | 114 | 49818 | 14.1 | NO | 11.3 | 0.3 | 0.4 | 88.0 | ○ | |
| 33 | P | 467 | 113 | 52771 | 14.9 | NO | 10.9 | 0.2 | 0.6 | 88.3 | ○ | |
| 34 | Q | 451 | 120 | 54120 | 14.2 | NO | 11.1 | 0.4 | 0.4 | 88.1 | ○ | |
| 35 | R | 504 | 107 | 53928 | 14.0 | NO | 10.4 | 0.8 | 0.7 | 88.1 | ○ | |
| 36 | S | 527 | 108 | 56916 | 14.3 | NO | 10.2 | 0.3 | 0.9 | 88.6 | ○ | |
| 37 | T | 530 | 110 | 58300 | 15.0 | NO | 10.3 | 0.4 | 0.8 | 88.5 | ○ | |
| 38 | U | 468 | 130 | 60840 | 14.8 | NO | 11.4 | 0.5 | 0.3 | 87.8 | ○ | |
| 39 | N | 473 | 106 | 50138 | 14.6 | NO | 11.6 | 0.8 | 0.5 | 87.1 | ○ | |
| 40 | N | 486 | 105 | 51030 | 14.8 | NO | 11.5 | 0.9 | 0.4 | 87.2 | ○ | |
| 41 | N | 458 | 101 | 46258 | 13.2 | NO | 1.5 | 0.2 | 0.2 | 98.1 | ○ | |
| 42 | O | 439 | 103 | 45217 | 13.1 | NO | 1.8 | 0.3 | 0.3 | 97.6 | ○ | |
| 43 | P | 471 | 104 | 48984 | 13.7 | NO | 2.3 | 0.2 | 0.5 | 97.0 | ○ | |
| 44 | Q | 452 | 109 | 49268 | 13.1 | NO | 1.6 | 0.4 | 0.3 | 97.7 | ○ | |
| 45 | R | 508 | 97 | 49276 | 13.0 | NO | 1.4 | 0.8 | 0.6 | 97.2 | ○ | |
| 46 | S | 529 | 96 | 50784 | 13.2 | NO | 2.2 | 0.3 | 0.8 | 96.7 | ○ | |
| 47 | T | 534 | 101 | 53934 | 13.9 | NO | 1.6 | 0.4 | 0.7 | 97.3 | ○ | |
| 48 | U | 472 | 119 | 56168 | 13.7 | NO | 1.9 | 0.5 | 0.2 | 97.4 | ○ | |
| 49 | N | 477 | 91 | 43407 | 13.4 | NO | 1.6 | 0.8 | 0.4 | 97.2 | ○ | |
| 50 | N | 490 | 90 | 44100 | 13.7 | NO | 2.2 | 0.9 | 0.3 | 96.6 | ○ | |

TABLE 6A

| COLD-ROLL-ING NO. | STEEL NO. | HOT-ROLL-ING NO. | COLD-ROLLING REDUCTION (%) | ANNEALING TEMPERATURE (°C) | COOLING RATE (°C/sec) | COOLING STOP TEMPERATURE (°C) | SHEET HOLE EXPANDABILITY (λ) (%) | GRINDING AMOUNT OF SURFACE (μm) | PLATING AMOUNT OF Ni (g/m$^2$) |
|---|---|---|---|---|---|---|---|---|---|
| 31 | N | 31 | 50 | 820 | 60 | 25 | 73 | 0.9 | 0.3 |
| 32 | O | 32 | 50 | 860 | 50 | 50 | 77 | 0.8 | 0.4 |
| 33 | P | 33 | 50 | 850 | 70 | 25 | 75 | 1.0 | 0.5 |
| 34 | Q | 34 | 50 | 840 | 80 | 35 | 83 | 0.9 | 1.0 |
| 35 | R | 35 | 50 | 870 | 50 | 40 | 70 | 0.4 | 1.2 |
| 36 | S | 36 | 50 | 850 | 60 | 25 | 71 | 0.8 | 0.5 |
| 37 | T | 37 | 50 | 900 | 70 | 50 | 72 | 1.2 | 0.5 |
| 38 | U | 38 | 50 | 840 | 80 | 60 | 92 | 1.5 | 0.7 |
| 39 | N | 31 | 50 | 850 | 40 | 70 | 62 | — | 1.3 |
| 40 | N | 31 | 50 | 830 | 50 | 50 | 61 | — | 1.2 |
| 41 | N | 41 | 50 | 820 | 60 | 25 | 73 | 0.9 | 0.3 |
| 42 | O | 42 | 50 | 860 | 50 | 50 | 77 | 0.8 | 0.4 |
| 43 | P | 43 | 50 | 850 | 70 | 25 | 75 | 1.0 | 0.5 |
| 44 | Q | 44 | 50 | 840 | 80 | 35 | 83 | 0.9 | 1.0 |
| 45 | R | 45 | 50 | 870 | 50 | 40 | 70 | 0.4 | 1.2 |
| 46 | S | 46 | 50 | 850 | 60 | 25 | 71 | 0.8 | 0.5 |
| 47 | T | 47 | 50 | 900 | 70 | 50 | 72 | 1.2 | 0.5 |
| 48 | U | 48 | 50 | 840 | 80 | 60 | 92 | 1.5 | 0.7 |
| 49 | N | 41 | 50 | 850 | 40 | 70 | 62 | — | 1.3 |
| 50 | N | 41 | 50 | 830 | 50 | 50 | 61 | — | 1.2 |

| COLD-ROLLING NO. | HEATING RATE (°C/sec) | ALLOYING HEATING TEMPERATURE (°C) | TREATMENT TEMPERATURE (°C) | ALLOYING TREATMENT TIME (sec) | SPECIFIC GRAVITY |
|---|---|---|---|---|---|
| 31 | 30 | 470 | 520 | 15 | 7.29 |
| 32 | 40 | 480 | 510 | 15 | 7.28 |
| 33 | 30 | 460 | 520 | 20 | 7.24 |
| 34 | 50 | 460 | 510 | 15 | 7.27 |
| 35 | 40 | 470 | 530 | 15 | 7.10 |
| 36 | 40 | 470 | 540 | 15 | 6.99 |
| 37 | 30 | 460 | 530 | 15 | 7.10 |
| 38 | 30 | 470 | 520 | 30 | 7.29 |
| 39 | 40 | 460 | 550 | 15 | 7.29 |
| 40 | 30 | 460 | 550 | 15 | 7.29 |
| 41 | 30 | 470 | — | — | 7.29 |
| 42 | 40 | 480 | — | — | 7.28 |
| 43 | 30 | 460 | — | — | 7.24 |
| 44 | 50 | 460 | — | — | 7.27 |
| 45 | 40 | 470 | — | — | 7.10 |
| 46 | 40 | 470 | — | — | 6.99 |
| 47 | 30 | 460 | — | — | 7.10 |
| 48 | 30 | 470 | — | — | 7.29 |
| 49 | 40 | 460 | — | — | 7.29 |
| 50 | 30 | 460 | — | — | 7.29 |

TABLE 6B

| | | MECHANICAL PROPERTIES | | | SPOT WELD-ABILITY CTS (kN) | PRES-ENCE OF NON-PLAT-ING | GALVANIZING PROPERTIES | | | | PLAT-ING ADHE-SION | RE-MARKS |
|---|---|---|---|---|---|---|---|---|---|---|---|---|
| | | | | | | | COMPOSITION OF GALVANIZING LAYER | | | | | |
| COLD-ROLL-ING NO. | STEEL NO. | TENSILE STRENGTH (TS) (MPa) | HOLE EXPAND-ABILITY (λ) (%) | TS × λ (MPa · %) | | | Fe (%) | Ni (%) | Al (%) | Zn AND IMPUR-ITIES (%) | | |
| 31 | N | 485 | 103 | 49955 | 8.2 | NO | 10.6 | 0.2 | 0.2 | 89.0 | ○ | EXAM-PLES |
| 32 | O | 469 | 107 | 50183 | 8.1 | NO | 11.2 | 0.3 | 0.4 | 88.1 | ○ | |
| 33 | P | 498 | 105 | 52290 | 8.6 | NO | 11.1 | 0.5 | 0.5 | 87.9 | ○ | |
| 34 | Q | 487 | 113 | 55031 | 8.1 | NO | 10.9 | 0.5 | 0.3 | 88.3 | ○ | |
| 35 | R | 535 | 100 | 53500 | 8.0 | NO | 10.3 | 0.8 | 0.6 | 88.3 | ○ | |
| 36 | S | 559 | 101 | 56459 | 8.2 | NO | 10.4 | 0.3 | 0.8 | 88.5 | ○ | |
| 37 | T | 561 | 102 | 57222 | 8.5 | NO | 10.3 | 0.4 | 0.7 | 88.6 | ○ | |
| 38 | U | 498 | 122 | 60756 | 8.3 | NO | 11.2 | 0.3 | 0.2 | 88.3 | ○ | |
| 39 | N | 503 | 92 | 46276 | 8.3 | NO | 11.4 | 0.8 | 0.4 | 87.4 | ○ | |
| 40 | N | 516 | 91 | 46956 | 8.4 | NO | 11.6 | 0.9 | 0.3 | 87.2 | ○ | |
| 41 | N | 489 | 94 | 45966 | 7.7 | NO | 1.3 | 0.2 | 0.2 | 98.3 | ○ | |
| 42 | O | 571 | 95 | 54245 | 7.6 | NO | 1.6 | 0.3 | 0.3 | 97.8 | ○ | |
| 43 | P | 502 | 96 | 48192 | 7.9 | NO | 2.1 | 0.5 | 0.4 | 97.0 | ○ | |
| 44 | 0 | 583 | 101 | 58883 | 7.6 | NO | 1.7 | 0.5 | 0.3 | 97.5 | ○ | |
| 45 | R | 540 | 91 | 49140 | 7.5 | NO | 1.5 | 0.8 | 0.5 | 97.2 | ○ | |
| 46 | S | 560 | 90 | 50400 | 7.7 | NO | 2.1 | 0.3 | 0.7 | 96.9 | ○ | |
| 47 | T | 566 | 92 | 52072 | 7.9 | NO | 1.8 | 0.4 | 0.6 | 97.2 | ○ | |
| 48 | U | 502 | 111 | 55722 | 7.8 | NO | 1.7 | 0.3 | 0.2 | 97.8 | ○ | |
| 49 | N | 507 | 83 | 42081 | 7.8 | NO | 1.5 | 0.8 | 0.4 | 97.3 | ○ | |
| 50 | N | 520 | 82 | 42640 | 7.9 | NO | 2.1 | 0.9 | 0.3 | 96.7 | ○ | |

What is claimed is:

1. A galvanized steel sheet, comprising:
a steel sheet; and
a galvanizing layer which is formed on a surface of the steel sheet,
wherein the steel sheet includes as a chemical component, by mass %,
C: more than 0.100% to 0.500%,
Si: 0.0001% to less than 0.20%,
Mn: more than 0.20% to 0.5%,
Al: 3.0% to 10.0%,
N: 0.0030% to 0.0100%,
Ti: more than 0.100% to 1.000%,
P: 0.00001% to 0.0200%,
S: 0.00001% to 0.0100%, and
a remainder including Fe and impurities,
wherein a sum of a C content and a Ti content satisfies 0.200<C+Ti≤1.500, by mass %,
a product of an Al content and an Si content satisfies Al×Si≤0.8,
the galvanizing layer is a hot-dip galvannealing layer and includes as a chemical component, by mass %,
Fe: 7% to 15%,
Ni: 0.05% to 1.0%,
Al: 0.15% to 2.0%, and
a remainder including Zn and impurities, and
the galvanized steel sheet has a specific gravity of 5.5 to less than 7.5,
a CTS of the galvanized steel sheet evaluated in accordance with JIS Z 3137 with a spot welding under welding conditions, which are adjusted such that a nugget diameter is 5×√t mm at a sheet thickness of t mm, is 5 kN or higher, and
TS×λ is 30000 MPa ·% or more, in which TS is defined as a tensile strength of the galvanized steel sheet and λ is defined as a hole expansion ratio of the galvanized steel sheet.

2. The galvanized steel sheet according to claim 1, wherein the steel sheet includes as a chemical component, by mass %, one element or two or more elements selected from the group consisting of
Nb: 0.300% or less,
V: 0.50% or less,
Cr: 3.00% or less,
Mo: 3.00% or less,
Ni: 5.00% or less,
Cu: 3.00% or less,
B: 0.0100% or less,
Ca: 0.0100% or less,
Mg: 0.0100% or less,
Zr: 0.0500% or less, and
REM: 0.0500% or less.

3. A method for producing the galvanized steel sheet according claim 1, the method comprising:
performing a Ni-preplating treatment to the steel sheet so as to set a plating amount of Ni to 0.2 g/m$^2$ to 2 g/m$^2$ per one-sided surface of the steel sheet;
performing a heating treatment to the steel sheet to which the Ni-preplating treatment is performed to a temperature of 430° C. to 480° C. at a heating rate of 20° C/sec or more; and
performing a hot-dip galvanizing treatment by immersing the steel sheet into a galvanizing bath having a bath temperature of 440° C. to 470° C., and including, by mass %, Al: 0.1% to 0.4% and a remainder including Zn and impurities.

4. The method for producing the galvanized steel sheet according to claim 3, further comprising:
performing an alloying heat treatment at a temperature of 470° C. to 560° C. for a heating time of 10 seconds to 40 seconds after the hot-dip galvanizing treatment is performed.

* * * * *